(12) United States Patent
Zalewski et al.

(10) Patent No.: US 9,682,319 B2
(45) Date of Patent: *Jun. 20, 2017

(54) COMBINER METHOD FOR ALTERING GAME GEARING

(75) Inventors: Gary M. Zalewski, Foster City, CA (US); Richard Marks, Foster City, CA (US); Xiadong Mao, Foster City, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 2028 days.

This patent is subject to a terminal disclaimer.

(21) Appl. No.: 11/768,108

(22) Filed: Jun. 25, 2007

(65) Prior Publication Data
US 2008/0009348 A1    Jan. 10, 2008

Related U.S. Application Data

(63) Continuation-in-part of application No. 11/381,721, filed on May 4, 2006, now Pat. No. 8,947,347, and a
(Continued)

(51) Int. Cl.
A63F 13/424    (2014.01)
A63F 13/23    (2014.01)
(Continued)

(52) U.S. Cl.
CPC ............ *A63F 13/424* (2014.09); *A63F 13/10* (2013.01); *A63F 13/211* (2014.09);
(Continued)

(58) Field of Classification Search
CPC .......... A63F 13/00; A63F 13/02; A63F 13/06; A63F 13/10; A63F 2300/6045;
(Continued)

(56) References Cited

U.S. PATENT DOCUMENTS

| 3,943,277 A | 3/1976 | Everly et al. .................... 348/19 |
| 4,263,504 A | 4/1981 | Thomas ......................... 235/454 |

(Continued)

FOREIGN PATENT DOCUMENTS

| EP | 0353200 | 1/1990 | ............ G01S 17/10 |
| EP | 0652686 | 5/1995 | ............... H04R 1/40 |

(Continued)

OTHER PUBLICATIONS

"NaturalPoint TrackIR Users Manual version 4.1.028", 2005, NaturalPoint Inc., available at <http://www.naturalpoint.com/trackir/06-support/TrackIR-manual-v4.1.028/tir4-Chapter_ALL.html>.*

(Continued)

*Primary Examiner* — Werner Garner
(74) *Attorney, Agent, or Firm* — Martine Penilla Group, LLP

(57) ABSTRACT

Computer implemented methods, apparatus and systems for enabling interactive interfacing with a computer game program are provided. One method provides an input device to accept and transmit user input to the computer game program. The input device enables activation of one or more gearing parameters associated with interactive components of the computer game program. In another operation, the method identifies an interactive component of the computer game program. The interactive component used to receive the transmitted user input to enable the interactive interfacing. In yet another operation the method detects user input to apply one of the gearing parameters to the interactive component if so dictated by the transmitted user input. The applied gearing parameter used to define a scaling ratio between the user input and a rate at which the interactive component reacts during execution of the computer game program.

16 Claims, 18 Drawing Sheets

Related U.S. Application Data continuation-in-part of application No. 11/429,414, filed on May 4, 2006, now Pat. No. 7,627,139, and a continuation-in-part of application No. 11/382,033, filed on May 6, 2006, now Pat. No. 8,686,939, and a continuation-in-part of application No. 11/382,035, filed on May 6, 2006, now Pat. No. 8,797,260, and a continuation-in-part of application No. 11/382,036, filed on May 6, 2006, now Pat. No. 9,474,968, and a continuation-in-part of application No. 11/382,041, filed on May 7, 2006, now Pat. No. 7,352,359, and a continuation-in-part of application No. 11/382,038, filed on May 6, 2006, now Pat. No. 7,352,358, and a continuation-in-part of application No. 11/382,040, filed on May 7, 2006, now Pat. No. 7,391,409, and a continuation-in-part of application No. 11/382,034, filed on May 6, 2006, now abandoned, and a continuation-in-part of application No. 10/211,075, filed on Jul. 31, 2002, now Pat. No. 7,421,471.

(51) Int. Cl.

| | | |
|---|---|---|
| *A63F 13/211* | (2014.01) | |
| *A63F 13/40* | (2014.01) | |
| *G06F 3/03* | (2006.01) | |
| *G06F 3/0346* | (2013.01) | |
| *G06F 3/038* | (2013.01) | |
| *A63F 13/213* | (2014.01) | |

(52) U.S. Cl.
CPC .......... *A63F 13/213* (2014.09); *G06F 3/0304* (2013.01); *G06F 3/038* (2013.01); *G06F 3/0325* (2013.01); *G06F 3/0346* (2013.01); *A63F 2300/105* (2013.01); *A63F 2300/1018* (2013.01); *A63F 2300/1087* (2013.01); *A63F 2300/6045* (2013.01)

(58) Field of Classification Search
CPC ............ A63F 2300/6054; A63F 13/424; A63F 13/211; A63F 13/213; A63F 2300/1018; A63F 2300/105; A63F 2300/1087; G06F 3/0304; G06F 3/0325; G06F 3/0346; G06F 3/038
USPC ...................................... 463/36–38
See application file for complete search history.

(56) References Cited

U.S. PATENT DOCUMENTS

| | | | |
|---|---|---|---|
| 4,313,227 A | 1/1982 | Eder ............................. 398/106 |
| 4,558,864 A | 12/1985 | Medwedeff ............... 273/148 B |
| 4,565,999 A | 1/1986 | King et al. .................... 345/158 |
| 4,787,051 A | 11/1988 | Olson |
| 4,802,227 A | 1/1989 | Elko et al. ...................... 381/92 |
| 4,823,001 A | 4/1989 | Kobayashi et al. ........... 356/616 |
| 4,843,568 A | 6/1989 | Krueger et al. ............... 382/100 |
| 4,963,858 A | 10/1990 | Chien ............................ 340/710 |
| 5,034,986 A | 7/1991 | Karmann et al. ............. 382/103 |
| 5,055,840 A | 10/1991 | Bartlett ............................ 341/31 |
| 5,111,401 A | 5/1992 | Everett et al. .................. 701/24 |
| 5,128,671 A | 7/1992 | Thomas, Jr. |
| 5,144,594 A | 9/1992 | Gilchrist ........................ 367/129 |
| 5,195,179 A | 3/1993 | Tokunaga ..................... 395/161 |
| 5,260,556 A | 11/1993 | Lake et al. .................... 235/494 |
| 5,297,061 A | 3/1994 | Dementhon et al. ......... 345/180 |
| 5,335,011 A | 8/1994 | Addeo et al. .................... 348/15 |
| 5,394,168 A | 2/1995 | Smith, III et al. ............ 345/156 |
| 5,426,450 A | 6/1995 | Drumm ......................... 345/168 |
| 5,435,554 A | 7/1995 | Lipson ............................ 273/88 |
| 5,453,758 A | 9/1995 | Sato .............................. 345/158 |
| 5,455,685 A | 10/1995 | Mori ............................. 348/363 |
| 5,473,701 A | 12/1995 | Cezanne et al. ................ 381/92 |
| 5,485,273 A | 1/1996 | Mark et al. ................... 356/350 |
| 5,517,333 A | 5/1996 | Tamura et al. ............... 358/158 |
| 5,528,265 A | 6/1996 | Harrison |
| 5,534,917 A | 7/1996 | MacDougall ................. 348/169 |
| 5,543,818 A | 8/1996 | Scott ............................ 345/168 |
| 5,554,980 A | 9/1996 | Hashimoto et al. |
| 5,557,684 A | 9/1996 | Wang et al. .................. 382/107 |
| 5,563,988 A | 10/1996 | Maes et al. ................... 345/421 |
| 5,568,928 A | 10/1996 | Munson et al. ................ 463/37 |
| 5,581,276 A | 12/1996 | Cipolla et al. ................ 345/156 |
| 5,583,478 A | 12/1996 | Renzi ........................ 340/407.1 |
| 5,586,231 A | 12/1996 | Florent et al. ................ 345/472 |
| 5,611,000 A | 3/1997 | Szeliski et al. ............... 382/294 |
| 5,611,731 A | 3/1997 | Bouton et al. .................. 463/37 |
| 5,616,078 A | 4/1997 | Oh ................................... 463/8 |
| 5,638,228 A | 6/1997 | Thomas, III ................... 360/60 |
| 5,649,021 A | 7/1997 | Matey et al. .................. 382/128 |
| 5,675,825 A | 10/1997 | Dreyer et al. ................ 395/800 |
| 5,675,828 A | 10/1997 | Stoel et al. ................... 395/825 |
| 5,677,710 A | 10/1997 | Thompson-Rohrlich ..... 345/173 |
| 5,706,364 A | 1/1998 | Kopec et al. ................. 382/159 |
| 5,768,415 A | 6/1998 | Jagadish et al. .............. 382/154 |
| 5,796,354 A | 8/1998 | Cartabiano et al. ........... 341/22 |
| 5,818,424 A | 10/1998 | Korth ........................... 345/158 |
| 5,846,086 A | 12/1998 | Bizzi et al. ................... 434/247 |
| 5,850,222 A | 12/1998 | Cone ............................ 345/418 |
| 5,850,473 A | 12/1998 | Andersson .................... 382/165 |
| 5,861,910 A | 1/1999 | McGarry et al. ............... 348/87 |
| 5,870,100 A | 2/1999 | DeFreitas ..................... 345/441 |
| 5,883,616 A | 3/1999 | Koizumi et al. .............. 345/156 |
| 5,889,672 A | 3/1999 | Schuler et al. ................. 700/83 |
| 5,900,863 A | 5/1999 | Numazaki ..................... 345/158 |
| 5,913,727 A | 6/1999 | Ahdoot .......................... 463/39 |
| 5,914,723 A | 6/1999 | Gajewska ..................... 345/597 |
| 5,917,493 A | 6/1999 | Tan et al. ...................... 715/835 |
| 5,917,936 A | 6/1999 | Katto ............................ 382/154 |
| 5,923,306 A | 7/1999 | Smith et al. ...................... 345/2 |
| 5,923,318 A | 7/1999 | Zhai et al. .................... 345/157 |
| 5,929,444 A | 7/1999 | Leichner .................... 250/341.7 |
| 5,930,383 A | 7/1999 | Netzer .......................... 382/154 |
| 5,930,741 A | 7/1999 | Kramer ......................... 702/153 |
| 5,937,081 A | 8/1999 | O'Brill et al. ................ 382/111 |
| 5,959,596 A | 9/1999 | McCarten et al. ................ 345/2 |
| 5,963,250 A | 10/1999 | Parker et al. ............... 348/211.6 |
| 5,978,772 A | 11/1999 | Mold .............................. 705/16 |
| 5,993,314 A | 11/1999 | Dannenberg et al. ........... 461/1 |
| 6,009,210 A | 12/1999 | Kang ............................ 382/276 |
| 6,014,167 A | 1/2000 | Suito et al. ................... 348/169 |
| 6,021,219 A | 2/2000 | Andersson et al. .......... 382/190 |
| 6,031,545 A | 2/2000 | Ellenby et al. ............... 345/435 |
| 6,031,934 A | 2/2000 | Ahmad et al. ................ 382/154 |
| 6,037,942 A | 3/2000 | Millington ................... 715/835 |
| 6,044,181 A | 3/2000 | Szeliski et al. ............... 382/284 |
| 6,049,619 A | 4/2000 | Anandan et al. ............. 382/107 |
| 6,056,640 A | 5/2000 | Schaaij ............................ 463/4 |
| 6,057,909 A | 5/2000 | Yahav et al. ................ 356/5.04 |
| 6,061,055 A | 5/2000 | Marks ........................... 382/276 |
| 6,072,494 A | 6/2000 | Nguyen ........................ 715/863 |
| 6,075,895 A | 6/2000 | Qiao et al. .................... 382/218 |
| 6,078,789 A | 6/2000 | Bodenmann et al. .......... 455/66 |
| 6,091,905 A | 7/2000 | Yahav et al. ................. 396/106 |
| 6,094,625 A | 7/2000 | Ralston ......................... 702/150 |
| 6,097,369 A | 8/2000 | Wambach ..................... 345/158 |
| 6,100,517 A | 8/2000 | Yahav et al. ................ 250/208.1 |
| 6,100,895 A | 8/2000 | Miura et al. .................. 345/426 |
| 6,101,289 A | 8/2000 | Kellner ......................... 382/276 |
| 6,115,052 A | 9/2000 | Freeman et al. .............. 345/473 |
| 6,134,346 A | 10/2000 | Berman et al. ............... 382/163 |
| 6,144,367 A | 11/2000 | Berstis ......................... 345/158 |
| 6,151,009 A | 11/2000 | Kanade et al. ............... 345/113 |
| 6,157,368 A | 12/2000 | Fager |
| 6,160,540 A | 12/2000 | Fishkin et al. ................ 345/184 |
| 6,166,744 A | 12/2000 | Jaszlics et al. ............... 345/435 |
| 6,173,059 B1 | 1/2001 | Huang et al. ................... 381/92 |
| 6,175,343 B1 | 1/2001 | Mitchell et al. .................. 345/8 |
| 6,184,863 B1 | 2/2001 | Sibert et al. .................. 345/156 |
| 6,191,773 B1 | 2/2001 | Maruno et al. ............... 345/158 |
| 6,195,104 B1 | 2/2001 | Lyons ........................... 345/473 |

(56) References Cited

U.S. PATENT DOCUMENTS

| | | |
|---|---|---|
| 6,215,898 B1 | 4/2001 | Woodfill et al. ............... 382/154 |
| 6,243,074 B1 | 6/2001 | Fishkin et al. ................ 345/156 |
| 6,243,491 B1 | 6/2001 | Andersson .................... 382/165 |
| 6,275,213 B1 | 8/2001 | Tremblay et al. ............. 345/156 |
| 6,281,930 B1 | 8/2001 | Parker et al. ................ 348/211.9 |
| 6,282,362 B1 | 8/2001 | Murphy et al. ................ 386/46 |
| 6,295,064 B1 | 9/2001 | Yamaguchi .................... 345/419 |
| 6,297,838 B1 | 10/2001 | Chang et al. ................. 715/863 |
| 6,304,267 B1 | 10/2001 | Sata ............................ 345/427 |
| 6,307,549 B1 | 10/2001 | King et al. ................... 715/810 |
| 6,307,568 B1 | 10/2001 | Rom ............................ 345/629 |
| 6,323,839 B1 | 11/2001 | Fukuda et al. ................ 345/157 |
| 6,323,942 B1 | 11/2001 | Bamji ......................... 356/5.01 |
| 6,326,901 B1 | 12/2001 | Gonzales ....................... 340/7.2 |
| 6,327,073 B1 | 12/2001 | Yahav et al. .................. 359/321 |
| 6,331,911 B1 | 12/2001 | Manassen et al. ............ 359/260 |
| 6,345,297 B1* | 2/2002 | Grimm et al. ................. 709/227 |
| 6,346,929 B1 | 2/2002 | Fukushima et al. ............ 354/8 |
| 6,351,661 B1 | 2/2002 | Cosman ....................... 600/426 |
| 6,371,849 B1 | 4/2002 | Togami .......................... 463/4 |
| 6,375,572 B1 | 4/2002 | Masuyama |
| 6,392,644 B1 | 5/2002 | Miyata et al. ................. 345/419 |
| 6,393,142 B1 | 5/2002 | Swain et al. .................. 382/154 |
| 6,394,897 B1 | 5/2002 | Togami .......................... 463/4 |
| 6,400,374 B2 | 6/2002 | Lanier ......................... 345/630 |
| 6,409,602 B1 | 6/2002 | Wiltshire et al. .............. 463/42 |
| 6,411,392 B1 | 6/2002 | Bender et al. ............... 358/1.14 |
| 6,411,744 B1 | 6/2002 | Edwards ....................... 382/294 |
| 6,417,836 B1 | 7/2002 | Kumar et al. ................. 345/156 |
| 6,441,825 B1 | 8/2002 | Peters .......................... 345/473 |
| 6,473,516 B1 | 10/2002 | Kawaguchi et al. .......... 382/100 |
| 6,498,860 B1 | 12/2002 | Sasaki et al. ................. 382/103 |
| 6,504,535 B1 | 1/2003 | Edmark ........................ 345/419 |
| 6,513,160 B2 | 1/2003 | Dureau ............................ 725/9 |
| 6,516,466 B1 | 2/2003 | Jackson ......................... 725/62 |
| 6,519,359 B1 | 2/2003 | Nafis et al. .................... 382/154 |
| 6,533,420 B1 | 3/2003 | Eichenlaub ..................... 353/7 |
| 6,542,927 B2 | 4/2003 | Rhoads ......................... 709/217 |
| 6,545,706 B1 | 4/2003 | Edwards et al. .............. 348/169 |
| 6,546,153 B1 | 4/2003 | Hoydal ......................... 382/285 |
| 6,556,704 B1 | 4/2003 | Chen ............................ 382/154 |
| 6,577,748 B2 | 6/2003 | Chang .......................... 382/100 |
| 6,580,414 B1 | 6/2003 | Wergen et al. ................ 345/156 |
| 6,580,415 B1 | 6/2003 | Kato et al. .................... 345/156 |
| 6,587,573 B1 | 7/2003 | Stam et al. .................... 382/104 |
| 6,587,835 B1 | 7/2003 | Treyz et al. .................... 705/14 |
| 6,593,956 B1 | 7/2003 | Potts et al. .................. 348/14.09 |
| 6,595,642 B2 | 7/2003 | Wirth ........................... 351/211 |
| 6,621,938 B1 | 9/2003 | Tanaka et al. ................ 382/276 |
| 6,628,265 B2 | 9/2003 | Hwang ......................... 345/156 |
| 6,661,914 B2 | 12/2003 | Dufour ......................... 382/154 |
| 6,674,415 B2 | 1/2004 | Nakamura et al. ............ 345/32 |
| 6,676,522 B2 | 1/2004 | Rowe et al. ................... 463/42 |
| 6,677,967 B2 | 1/2004 | Sawano et al. ............... 715/839 |
| 6,677,987 B1 | 1/2004 | Girod ........................... 348/171 |
| 6,709,108 B2 | 3/2004 | Levine et al. ................. 351/211 |
| 6,712,703 B2 | 3/2004 | Miyamoto et al. ............ 463/43 |
| 6,720,949 B1 | 4/2004 | Pryor et al. .................. 345/158 |
| 6,727,988 B2 | 4/2004 | Kim et al. ..................... 356/319 |
| 6,741,741 B2 | 5/2004 | Farrell .......................... 382/199 |
| 6,746,124 B2 | 6/2004 | Fischer et al. .................. 353/43 |
| 6,749,510 B2 | 6/2004 | Giobbi .......................... 463/42 |
| 6,751,338 B1 | 6/2004 | Wallack ........................ 382/106 |
| 6,753,849 B1 | 6/2004 | Curran et al. ................. 345/156 |
| 6,767,282 B2 | 7/2004 | Matsuyama et al. ............ 463/3 |
| 6,769,769 B2 | 8/2004 | Podoleanu et al. ............ 351/221 |
| 6,772,057 B2 | 8/2004 | Breed et al. .................... 701/45 |
| 6,774,939 B1 | 8/2004 | Peng ......................... 348/231.4 |
| 6,785,329 B1 | 8/2004 | Pan et al. .................. 375/240.08 |
| 6,789,967 B1 | 9/2004 | Forester ........................ 400/489 |
| 6,791,531 B1 | 9/2004 | Johnston et al. .............. 345/157 |
| 6,795,068 B1 | 9/2004 | Marks .......................... 345/419 |
| 6,809,776 B1 | 10/2004 | Simpson ....................... 348/565 |
| 6,819,318 B1 | 11/2004 | Geng ............................ 345/420 |
| 6,846,238 B2 | 1/2005 | Wells ............................. 463/39 |
| 6,847,311 B2 | 1/2005 | Li ................................. 341/28 |
| 6,863,609 B2 | 3/2005 | Okuda et al. ................... 463/36 |
| 6,870,526 B2 | 3/2005 | Zngf et al. ..................... 345/185 |
| 6,873,747 B2 | 3/2005 | Askary ......................... 382/295 |
| 6,881,147 B2 | 4/2005 | Naghi et al. .................... 463/35 |
| 6,884,171 B2 | 4/2005 | Eck et al. ....................... 463/42 |
| 6,890,262 B2 | 5/2005 | Oishi et al. ..................... 463/31 |
| 6,917,688 B2 | 7/2005 | Yu et al. ..................... 381/94.7 |
| 6,919,824 B2 | 7/2005 | Lee ............................... 341/20 |
| 6,921,332 B2* | 7/2005 | Fukunaga et al. ............... 463/8 |
| 6,924,787 B2 | 8/2005 | Kramer et al. ................ 345/156 |
| 6,928,180 B2 | 8/2005 | Stam et al. .................... 382/104 |
| 6,930,725 B1 | 8/2005 | Hayashi ........................ 348/373 |
| 6,931,125 B2 | 8/2005 | Smallwood ................ 379/433.07 |
| 6,931,596 B2 | 8/2005 | Gutta et al. ................... 715/728 |
| 6,943,776 B2 | 9/2005 | Ehrenburg .................... 345/168 |
| 6,945,653 B2 | 9/2005 | Kobori et al. ................... 353/30 |
| 6,947,576 B2 | 9/2005 | Stam et al. .................... 382/104 |
| 6,951,515 B2 | 10/2005 | Ohshima et al. ................ 463/31 |
| 6,952,198 B2 | 10/2005 | Hansen ......................... 345/158 |
| 6,965,362 B1 | 11/2005 | Ishizuka ......................... 345/82 |
| 6,970,183 B1 | 11/2005 | Monroe ........................ 348/143 |
| 6,990,639 B2 | 1/2006 | Wilson ......................... 715/863 |
| 7,006,009 B2 | 2/2006 | Newman ..................... 340/854.5 |
| 7,016,411 B2 | 3/2006 | Azuma et al. ............. 375/240.08 |
| 7,016,532 B2 | 3/2006 | Boncyk et al. ................ 382/165 |
| 7,023,475 B2 | 4/2006 | Bean et al. ................. 348/207.99 |
| 7,039,199 B2 | 5/2006 | Rui ................................ 381/92 |
| 7,039,253 B2 | 5/2006 | Matsuoka et al. ............. 382/295 |
| 7,042,440 B2 | 5/2006 | Pryor et al. .................. 345/158 |
| 7,043,056 B2 | 5/2006 | Edwards et al. .............. 382/103 |
| 7,054,452 B2 | 5/2006 | Ukita .............................. 381/92 |
| 7,059,962 B2 | 6/2006 | Watashiba ....................... 463/2 |
| 7,061,507 B1 | 6/2006 | Tuomi et al. .................. 345/611 |
| 7,071,914 B1 | 7/2006 | Marks .......................... 345/156 |
| 7,084,887 B1 | 8/2006 | Sato et al. ..................... 345/633 |
| 7,090,352 B2 | 8/2006 | Kobori et al. ................... 353/30 |
| 7,098,891 B1 | 8/2006 | Pryor ........................... 345/158 |
| 7,102,615 B2 | 9/2006 | Marks .......................... 345/156 |
| 7,106,366 B2 | 9/2006 | Parker et al. ................ 348/222.1 |
| 7,113,635 B2 | 9/2006 | Robert et al. ................. 382/154 |
| 7,116,330 B2 | 10/2006 | Marshall et al. .............. 345/474 |
| 7,116,342 B2 | 10/2006 | Dengler et al. ............... 345/630 |
| 7,121,946 B2 | 10/2006 | Paul et al. ....................... 463/36 |
| 7,139,767 B1 | 11/2006 | Taylor et al. .................. 707/102 |
| 7,148,922 B2 | 12/2006 | Shimada ....................... 348/370 |
| 7,156,311 B2 | 1/2007 | Attia et al. ................ 235/462.46 |
| 7,158,118 B2 | 1/2007 | Liberty ......................... 345/158 |
| 7,161,634 B2 | 1/2007 | Long ............................ 384/624 |
| 7,164,413 B2 | 1/2007 | Davis et al. ................... 345/163 |
| 7,174,312 B2 | 2/2007 | Harper et al. ................... 705/35 |
| 7,183,929 B1 | 2/2007 | Antebi et al. ................ 340/573.1 |
| 7,212,308 B2 | 5/2007 | Morgan ........................ 358/1.18 |
| 7,223,173 B2 | 5/2007 | Masuyama et al. ............. 463/36 |
| 7,224,384 B1 | 5/2007 | Iddan et al. ................ 348/207.99 |
| 7,227,526 B2 | 6/2007 | Hildreth et al. ............... 345/156 |
| 7,227,976 B1 | 6/2007 | Jung et al. .................... 382/103 |
| 7,239,301 B2 | 7/2007 | Liberty et al. ................ 345/158 |
| 7,245,273 B2 | 7/2007 | Eberl et al. ................... 351/211 |
| 7,259,375 B2 | 8/2007 | Tichit et al. .................. 250/341.8 |
| 7,262,760 B2 | 8/2007 | Liberty ......................... 345/158 |
| 7,263,462 B2 | 8/2007 | Funge et al. .................. 702/179 |
| 7,274,305 B1 | 9/2007 | Lutrell ...................... 340/870.02 |
| 7,283,679 B2 | 10/2007 | Okada et al. ................. 382/260 |
| 7,296,007 B1 | 11/2007 | Funge et al. .................... 706/47 |
| 7,301,530 B2 | 11/2007 | Lee et al. ...................... 345/158 |
| 7,301,547 B2 | 11/2007 | Martins et al. ................ 345/633 |
| 7,305,114 B2 | 12/2007 | Wolff et al. ................... 709/200 |
| 7,346,387 B1 | 3/2008 | Wachter et al. ............... 600/476 |
| 7,351,148 B1* | 4/2008 | Rothschild et al. ............. 463/30 |
| 7,352,359 B2 | 4/2008 | Zalewski et al. .............. 345/156 |
| 7,364,297 B2 | 4/2008 | Goldfain et al. .............. 351/206 |
| 7,379,559 B2 | 5/2008 | Wallace et al. ............... 382/100 |
| 7,391,409 B2 | 6/2008 | Zalewski et al. .............. 345/156 |
| 7,414,611 B2 | 8/2008 | Liberty ......................... 345/158 |
| 7,436,887 B2 | 10/2008 | Yeredor et al. ................ 375/240 |
| 7,446,650 B2 | 11/2008 | Scholfield et al. .......... 340/425.5 |
| 7,489,298 B2 | 2/2009 | Liberty ......................... 345/158 |
| 7,489,299 B2 | 2/2009 | Liberty et al. ................ 345/163 |

(56) References Cited

U.S. PATENT DOCUMENTS

| | | | |
|---|---|---|---|
| 7,545,926 B2 | 6/2009 | Mao | 379/406.08 |
| 7,555,157 B2 | 6/2009 | Davidson et al. | 382/154 |
| 7,558,698 B2 | 7/2009 | Funge et al. | 702/179 |
| 7,613,610 B1 | 11/2009 | Zimmerman et al. | 704/235 |
| 7,623,115 B2 | 11/2009 | Marks | 345/156 |
| 7,627,139 B2 | 12/2009 | Marks et al. | 382/103 |
| 7,636,645 B1 | 12/2009 | Yen et al. | 702/152 |
| 7,636,697 B1 | 12/2009 | Dobson et al. | 706/12 |
| 7,636,701 B2 | 12/2009 | Funge et al. | 706/47 |
| 7,646,372 B2 | 1/2010 | Marks et al. | 345/156 |
| 7,665,041 B2 | 2/2010 | Wilson et al. | 715/860 |
| 7,697,700 B2 | 4/2010 | Mao | 381/94.3 |
| 7,721,231 B2 | 5/2010 | Wilson | 715/863 |
| 2001/0056477 A1 | 12/2001 | McTernan et al. | 709/219 |
| 2002/0010655 A1 | 1/2002 | Kjallstrom | 705/27 |
| 2002/0023027 A1 | 2/2002 | Simonds | 705/26 |
| 2002/0036617 A1 | 3/2002 | Pryor | 345/156 |
| 2002/0056114 A1 | 5/2002 | Fillebrown et al. | 725/78 |
| 2002/0065121 A1* | 5/2002 | Fukunaga et al. | 463/8 |
| 2002/0072414 A1 | 6/2002 | Stylinski et al. | 463/42 |
| 2002/0075286 A1 | 6/2002 | Yonezawa et al. | 345/679 |
| 2002/0083461 A1 | 6/2002 | Hutcheson et al. | 725/62 |
| 2002/0085097 A1 | 7/2002 | Colmenarez et al. | 348/211 |
| 2002/0094189 A1 | 7/2002 | Navab et al. | 386/4 |
| 2002/0126899 A1 | 9/2002 | Farrell | 382/199 |
| 2002/0134151 A1 | 9/2002 | Naruoka et al. | 73/291 |
| 2002/0158873 A1 | 10/2002 | Williamson | 345/427 |
| 2003/0014212 A1 | 1/2003 | Ralston et al. | 702/150 |
| 2003/0022716 A1 | 1/2003 | Park et al. | 463/36 |
| 2003/0093591 A1 | 5/2003 | Hohl | 710/22 |
| 2003/0100363 A1 | 5/2003 | Ali | 436/30 |
| 2003/0123705 A1 | 7/2003 | Stam et al. | 382/104 |
| 2003/0160862 A1 | 8/2003 | Charlier et al. | 348/14.08 |
| 2003/0232649 A1 | 12/2003 | Gizis et al. | 463/40 |
| 2004/0001082 A1 | 1/2004 | Said | 345/730 |
| 2004/0017355 A1 | 1/2004 | Shim | 345/157 |
| 2004/0035925 A1 | 2/2004 | Wu et al. | 235/380 |
| 2004/0054512 A1 | 3/2004 | Kim et al. | 703/8 |
| 2004/0063480 A1 | 4/2004 | Wang | 463/8 |
| 2004/0063481 A1 | 4/2004 | Wang | 463/8 |
| 2004/0070565 A1 | 4/2004 | Nayar et al. | 345/156 |
| 2004/0087366 A1 | 5/2004 | Shum et al. | 463/36 |
| 2004/0095327 A1 | 5/2004 | Lo | 345/169 |
| 2004/0140955 A1 | 7/2004 | Metz | 345/166 |
| 2004/0150728 A1 | 8/2004 | Ogino | 348/239 |
| 2004/0178576 A1 | 9/2004 | Hillis et al. | 273/148 |
| 2004/0189720 A1 | 9/2004 | Wilson et al. | 345/863 |
| 2004/0212589 A1 | 10/2004 | Hall et al. | |
| 2004/0213419 A1 | 10/2004 | Varma et al. | 381/92 |
| 2004/0227725 A1 | 11/2004 | Calarco et al. | 345/156 |
| 2004/0254017 A1 | 12/2004 | Cheng et al. | 463/35 |
| 2005/0037844 A1 | 2/2005 | Shum et al. | 463/36 |
| 2005/0047611 A1 | 3/2005 | Mao | 381/94.7 |
| 2005/0088369 A1 | 4/2005 | Yoshioka | 345/60 |
| 2005/0102374 A1 | 5/2005 | Moragne et al. | 709/217 |
| 2005/0105777 A1 | 5/2005 | Kozlowski et al. | 382/115 |
| 2005/0117045 A1 | 6/2005 | Abdellatif et al. | 384/335 |
| 2005/0162385 A1 | 7/2005 | Doi et al. | 345/156 |
| 2005/0198095 A1 | 9/2005 | Du et al. | 709/205 |
| 2005/0226431 A1 | 10/2005 | Mao | 381/61 |
| 2005/0239524 A1* | 10/2005 | Longman et al. | 463/9 |
| 2005/0239548 A1 | 10/2005 | Ueshima et al. | 463/36 |
| 2006/0033713 A1 | 2/2006 | Pryor | 345/158 |
| 2006/0035710 A1 | 2/2006 | Festejo et al. | 463/36 |
| 2006/0038819 A1 | 2/2006 | Festejo et al. | 345/530 |
| 2006/0204012 A1 | 9/2006 | Marks et al. | 381/26 |
| 2006/0233389 A1 | 10/2006 | Mao et al. | 381/92 |
| 2006/0250681 A1 | 11/2006 | Park et al. | 345/156 |
| 2006/0252541 A1 | 11/2006 | Zalewski et al. | 463/156 |
| 2006/0252543 A1 | 11/2006 | Van Noland et al. | 463/37 |
| 2006/0264258 A1 | 11/2006 | Zalewski et al. | 463/36 |
| 2006/0264259 A1 | 11/2006 | Zalewski et al. | 463/36 |
| 2006/0264260 A1 | 11/2006 | Zalewski et al. | 463/36 |
| 2006/0269072 A1 | 11/2006 | Mao | 381/56 |
| 2006/0269073 A1 | 11/2006 | Mao | 381/56 |
| 2006/0274032 A1 | 12/2006 | Mao et al. | 345/156 |
| 2006/0274911 A1 | 12/2006 | Mao et al. | 381/334 |
| 2006/0280312 A1 | 12/2006 | Mao | 381/56 |
| 2006/0282873 A1 | 12/2006 | Zalewski et al. | 725/133 |
| 2006/0287084 A1 | 12/2006 | Mao et al. | 463/37 |
| 2006/0287085 A1 | 12/2006 | Mao et al. | 463/37 |
| 2006/0287086 A1 | 12/2006 | Zalewski et al. | 436/37 |
| 2006/0287087 A1 | 12/2006 | Zalewski et al. | 463/37 |
| 2007/0015559 A1 | 1/2007 | Zalewski et al. | 463/1 |
| 2007/0021208 A1 | 1/2007 | Mao et al. | 463/36 |
| 2007/0025562 A1 | 2/2007 | Zalewski et al. | 381/92 |
| 2007/0049374 A1* | 3/2007 | Ikeda et al. | 463/30 |
| 2007/0060336 A1 | 3/2007 | Marks et al. | 463/30 |
| 2007/0061413 A1 | 3/2007 | Larsen et al. | 709/217 |
| 2007/0066394 A1 | 3/2007 | Ikeda et al. | 463/37 |
| 2007/0072675 A1 | 3/2007 | Hamano et al. | 463/42 |
| 2007/0117628 A1* | 5/2007 | Stanley | 463/36 |
| 2007/0120834 A1 | 5/2007 | Boillot | 354/103 |
| 2007/0120996 A1 | 5/2007 | Boillot | 384/345 |
| 2007/0260340 A1 | 11/2007 | Mao | 700/94 |
| 2007/0260517 A1 | 11/2007 | Zalewski et al. | 705/14 |
| 2007/0261077 A1 | 11/2007 | Zalewski et al. | 725/35 |
| 2008/0056561 A1 | 3/2008 | Sawachi | 382/154 |
| 2008/0070684 A1 | 3/2008 | Haigh-Hutchinson | 463/32 |
| 2008/0091421 A1 | 4/2008 | Gustavsson | 704/233 |
| 2008/0208613 A1 | 8/2008 | Scibora | 705/1 |
| 2009/0010494 A1 | 1/2009 | Bechtel et al. | 382/104 |
| 2009/0016642 A1 | 1/2009 | Hart | 382/278 |
| 2009/0221368 A1 | 9/2009 | Yen et al. | 463/32 |
| 2009/0221374 A1 | 9/2009 | Yen et al. | 463/42 |
| 2009/0288064 A1 | 11/2009 | Yen et al. | 717/106 |
| 2010/0004896 A1 | 1/2010 | Yen et al. | 702/153 |
| 2010/0137064 A1 | 6/2010 | Shum et al. | 463/36 |

FOREIGN PATENT DOCUMENTS

| | | | |
|---|---|---|---|
| EP | 0750202 | 12/1996 | G01S 17/00 |
| EP | 0835676 | 4/1998 | A63F 9/22 |
| EP | 1098686 | 5/2003 | A63F 13/04 |
| EP | 1435258 | 7/2004 | A63F 13/04 |
| FR | 28514695 | 4/2002 | A63H 30/00 |
| GB | 2206716 | 1/1989 | G06K 7/12 |
| GB | 2206716 | 11/1989 | G06K 7/12 |
| GB | 2376397 | 11/2002 | G06F 3/00 |
| GB | 2388418 | 11/2003 | G06F 3/033 |
| JP | 1284897 | 11/1989 | G10H 1/34 |
| JP | 6102980 | 4/1994 | G06F 3/02 |
| JP | 9128141 | 5/1997 | G06F 3/033 |
| JP | 9185456 | 7/1997 | G06F 3/00 |
| JP | 1138949 | 2/1999 | G09G 5/00 |
| JP | 2000-172431 | 6/2000 | G06F 3/033 |
| JP | 2000172431 | 6/2000 | G06F 3/033 |
| JP | 2000259856 | 9/2000 | G06T 17/00 |
| JP | 2000350859 | 12/2000 | A63F 13/00 |
| JP | 2001-166676 | 6/2001 | G09B 9/00 |
| JP | 2001166676 | 6/2001 | G09B 9/00 |
| JP | 2002369969 | 12/2002 | A63F 13/12 |
| JP | 2004-145448 | 5/2004 | G06T 17/40 |
| JP | 2004145448 | 5/2004 | G06T 17/40 |
| JP | 2005046422 | 2/2005 | A63F 13/06 |
| WO | WO 88/05942 | 8/1988 | G06F 3/033 |
| WO | WO 98/48571 | 10/1998 | H04N 5/45 |
| WO | WO 99/35633 | 7/1999 | |
| WO | WO 99/26198 | 10/1999 | |
| WO | 02/27456 | 2/2002 | G06F 3/00 |
| WO | WO 03/079179 | 9/2003 | G06F 3/033 |
| WO | WO 2004/073814 A1 | 2/2004 | |
| WO | WO 2004/073815 A1 | 2/2004 | |
| WO | WO 2005/073838 | 8/2005 | G06F 3/033 |
| WO | WO 2005107911 | 11/2005 | A63F 13/06 |
| WO | WO 2007095082 | 8/2007 | |
| WO | WO 2008/056180 | 5/2008 | G01B 11/04 |

OTHER PUBLICATIONS

Frank Dietrich; "real Time Animation Techniques with Microcomputers"; Pixel Creations; University of Michigan 1982.

(56) References Cited

OTHER PUBLICATIONS

Jojic, et al., "Tracking Self-Occluding Articulated Objects in Dense Disparity Maps", Computer Vision, 1999, The Proceedings fo the Seventh IEEE International Conference on Kerkyra, Greece Sep. 20-27, 1999, Los Alamitos, CA, US, IEEE Computer Society, US, Sep. 20, 1999, (Sep. 20, 1999), pp. 123-130.

Klinker, et al., "Distributed User Tracking Concepts for Augmented Reality Applications", pp. 37-44, Augmented Reality, 2000, IEEE and ACM Int'l Symposium, Oct. 2000, XP010520308, ISBN: 0-7695-0846-4, Germany.

Nakagawa, et al., "A Collision Detection and Motion Image Synthesis Between a Background Image and a Foreground 3-Dimensional Object", TVRSJ Bol. 4, No. 2, pp. 425-430, 1999, Japan.

Mihara, et al., "A Realtime Vision-Based Interface Using Motion Processor and Applications to Robotics", vol. J84-D-11, No. 9, pp. 2070-2078, Sep. 2001, Japan.

Nakamura, et al., "A Consideration on Reconstructing 3-D Model Using Object Views", 2004-01601-003, pp. 17-21, Kokkaido University, Japan, nakamura@media.eng.hokudai.ac.jp.

Nishida, et al., "A Method of Estimating Human Shapes by Fitting the Standard Human Model to Partial Measured Data", D-II vol. J84-D-11, No. 7, pp. 1310-1318, Jul. 2001.

Bolt, R.A., "Put-that-there: voice and gesture at the graphics interface", Computer Graphics, vol. 14, No. 3 (ACM SIGGRAPH Conference Proceedings) Jul. 1980, pp. 262 270.

DeWitt, Thomas and Edelstein, Phil, "Pantomation: A System for Position Tracking," Proceedings of the 2nd Symposium on Small Computers in the Arts, Oct. 1982, pp. 61-69.

Richardson et al., "Virtual Network Computing" IEEE Internet Computing, vol. 2,No. 1 Jan./Feb. 1998.

Fujitsu, "Internet Development of Emulators" Abstract, Mar. 1997, vol. 48, No. 2.

Lanier, Jaron, "Virtually there: three-dimensional tele-immersion may eventually bring the world to your desk", Scientific American, ISSN: 0036-8733, Year: 2001.

"The Tracking Cube: A Three-Dimentional Input Device", IBM Technical Disclosure Bulletin, Aug. 1, 1989, pp. 91-95, No. 3B, IBM Corp.New York, U.S.

K. B. Shimoga, et al., "Touch and Force Reflection for Telepresence Surgery", Engineering in Medicine and Biology Opportunities of the IEEEE, Baltimore, MD, USA, Nov. 3, 1994, New York, New York, USA, pp. 1049-1050.

Iddan, et al., "3D Imaging in the Studio (And Elsewhere . . . )", Proceedings of the SPIE, SPIE, Bellingham, VA, US, vol. 4298, Jan. 24, 2001, pp. 48-55, XP008005351.

Ephraim et al. "Speech Enhancement Using a Minimum Mean-Square Error Log-Spectral Amplitude Estimator", 1985, IEEE.

Ephraim et al. "Speech Enhancement Using a Minimum Mean-Square Error Short-Time Spectral Amplitude Estimator", 1984, IEEE.

Richardson et al. "Virtual Network Computing", 1998, IEEE Internet Computing vol. 2.

XP-002453974, "CFS and FS95/98/2000: How to Use the Trim Controls to Keep Your Aircraft Level", Aug. 10, 2007, http://support.microsoft.com/?scid=kb%3Ben-us%3B175195&x=13 &y=15.

Wilson & Darrell, "Audio-Video Array Source Localization for Intelligent Environments", 2002 IEEE Dept. of Electrical Eng and Computer Science, MIT, Cambridge, MA 02139.

Fiala, et al., "A Panoramic Video and Acoustic Beamforming Sensor for Videoconferencing", 2004 Jeff, Computational Video Group, National Research Council, Ottawa, Canada K1A 0R6.

Hemmi, et al., "3-D Natural Interactive Interface-Using Marker Tracking from a Single View",Sep. 9, 1991, Systems and Computers in Japan.

Kanade, et al., "A Stereo Machine for Video-rate Dense Depth Mapping and Its New Application" 1996, CVPR 96, IEEE Computer Society Conference, pp. 196-202 (022).

Gvili, et al., "Depth Keying", SPIE vol. 5006 (2003), 2003 SPIE-IS&T, pp. 564-574 (031).

\* cited by examiner

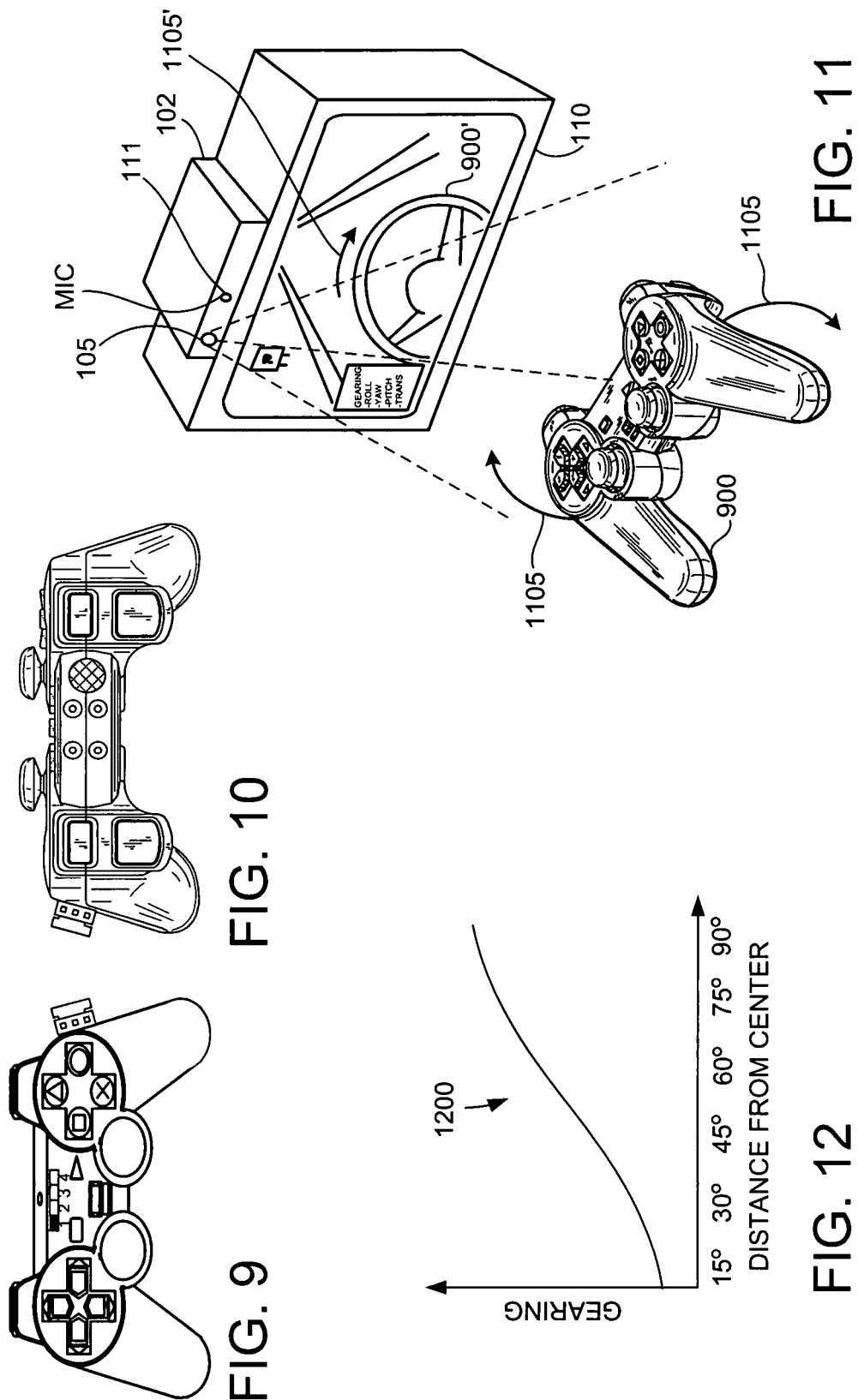

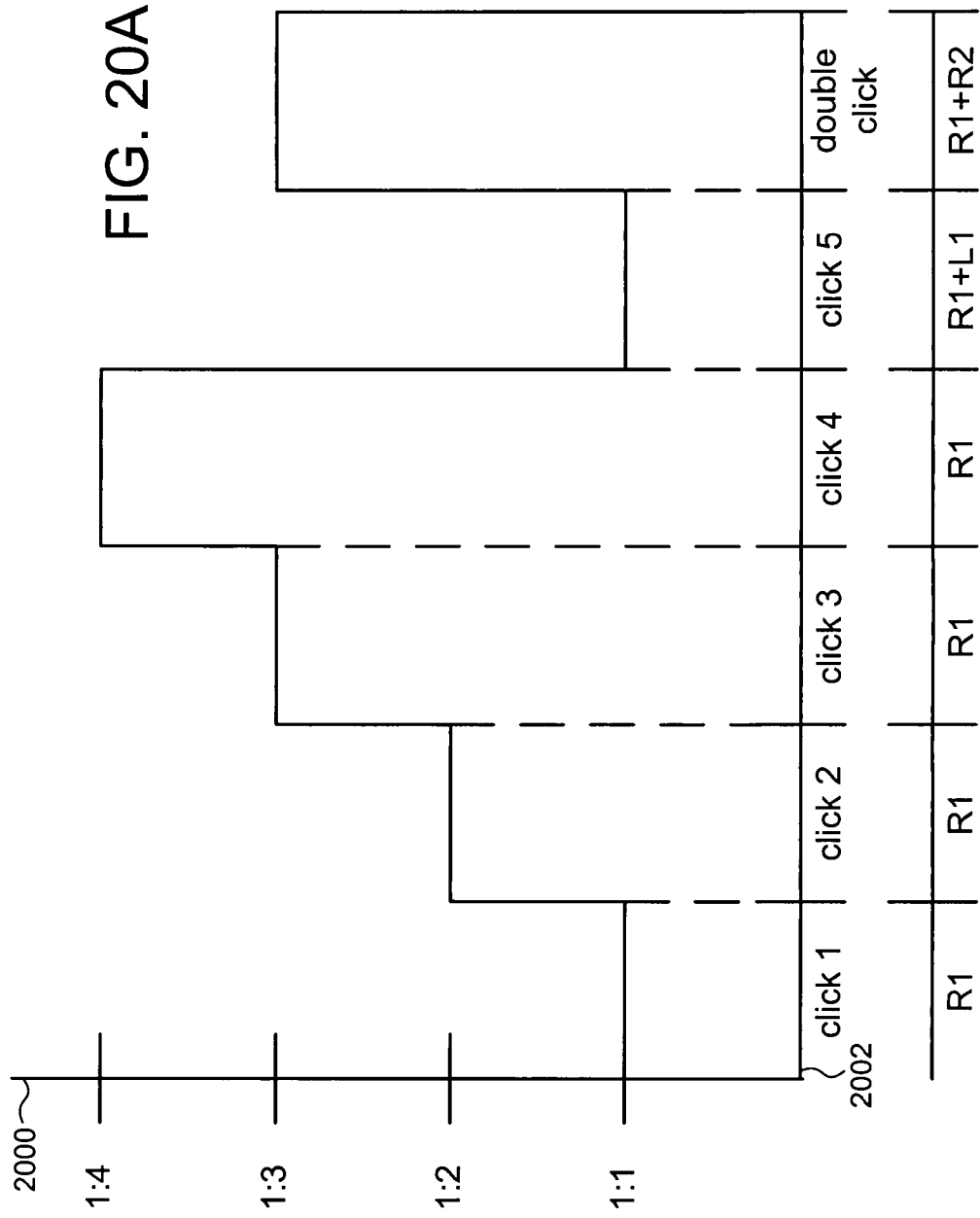

COMBINER METHOD FOR ALTERING GAME GEARING

CLAIM OF PRIORITY

This application is a continuation in part (CIP) of: (1) U.S. patent application Ser. No. 11/381,721, to Xiao Dong Mao, entitled "SELECTIVE SOUND SOURCE LISTENING IN CONJUNCTION WITH COMPUTER INTERACTIVE PROCESSING", filed on May 4, 2006 now U.S. Pat. No. 8,947,347; (2) U.S. patent application Ser. No. 11/429,414, to Richard Marks et al., entitled "Computer Image and Audio Processing of Intensity and Input Devices for Interfacing With A Computer Program", filed on May 4, 2006 now U.S. Pat. No. 7,627,139; (3) U.S. patent application Ser. No. 11/382,033, entitled "SYSTEM, METHOD, AND APPARATUS FOR THREE-DIMENSIONAL INPUT CONTROL", filed on May 6, 2006 now U.S. Pat. No. 8,686,939; (4) U.S. patent application Ser. No. 11/382,035, entitled "INERTIALLY TRACKABLE HAND-HELD CONTROLLER", filed on May 6, 2006 now U.S. Pat. No. 8,797,260; (5) U.S. patent application Ser. No. 11/382,036, entitled "METHOD AND SYSTEM FOR APPLYING GEARING EFFECTS TO VISUAL TRACKING", filed on May 6, 2006 now U.S. Pat. No. 9,474,968; (6) U.S. patent application Ser. No. 11/382,041, entitled "METHOD AND SYSTEM FOR APPLYING GEARING EFFECTS TO INERTIAL TRACKING", filed on May 7, 2006 now U.S. Pat. No. 7,352,359; (7) U.S. patent application Ser. No. 11/382,038, entitled "METHOD AND SYSTEM FOR APPLYING GEARING EFFECTS TO ACOUSTICAL TRACKING", filed on May 6, 2006 now U.S. Pat. No. 7,352,358; (8) U.S. patent application Ser. No. 11/382,040, entitled "METHOD AND SYSTEM FOR APPLYING GEARING EFFECTS TO MULTI-CHANNEL MIXED INPUT", filed on May 7, 2006 now U.S. Pat. No. 7,391,409; and (9) U.S. patent application Ser. No. 11/382,034, entitled "SCHEME FOR DETECTING AND TRACKING USER MANIPULATION OF A GAME CONTROLLER BODY", filed on May 6, 2006 now abandoned; (10) U.S. patent application Ser. No. 10/211,075, entitled "CONFIGURATION SWITCHING DYNAMICALLY CHANGING BETWEEN NETWORK COMMUNICATION ARCHITECTURES", filed on Jul. 31, 2002 now U.S. Pat. No. 7,421,471, each of these disclosures are incorporated herein by reference.

BACKGROUND

The video game industry has seen many changes over the years. As computing power has expanded, developers of video games have likewise created game software that takes advantage of these increases in computing power. To this end, video game developers have been coding games that incorporate sophisticated operations and mathematics to produce a very realistic game experience.

Example gaming platforms include the Sony Playstation or Sony Playstation2 (PS2), each of which is sold in the form of a game console. As is well known, the game console is designed to connect to a monitor (usually a television) and enable user interaction through handheld controllers. The game console is designed with specialized processing hardware, including a CPU, a graphics synthesizer for processing intensive graphics operations, a vector unit for performing geometry transformations, and other glue hardware, firmware, and software. The game console is further designed with an optical disc tray for receiving game compact discs for local play through the game console. Online gaming is also possible, wherein a user can interactively play against or with other users over the Internet.

As game complexity continues to intrigue players, gaming software and hardware manufacturers have continued to innovate to enable additional interactivity. In reality, however, the way in which users interact with a game has not changed dramatically over the years. Commonly, users still play computer games using hand held controllers or interact with programs using mouse pointing devices.

In view of the foregoing, there is a need for methods and systems that enable more advanced user interactivity with game play.

SUMMARY

Broadly speaking, the present invention fills these needs by providing methods that enable dynamically configurable user interactivity with a computing system. In one embodiment, a computer implemented method for enabling interactive interfacing with a computer game program is disclosed. The method provides an input device to accept and transmit user input to the computer game program. The input device enables activation of one or more gearing parameters associated with interactive components of the computer game program. In another operation, the method identifies an interactive component of the computer game program. The interactive component used to receive the transmitted user input to enable the interactive interfacing. In yet another operation the method detects user input to apply one of the gearing parameters to the interactive component if so dictated by the transmitted user input. The applied gearing parameter used to define a scaling ratio between the user input and a rate at which the interactive component reacts during execution of the computer game program.

In another embodiment, a computer implemented method for directing changes in response by a component of a video game in response to selected user input is disclosed. This method accepts a primary user input at an input device, the primary user input controlling an interactive component of the video game. The method also defines a plurality of gearings. The gearings are used to define ratios for scaling responses of the interactive component of the video game to the primary user input. The method then allows user controlled interactive switching between two or more of the plurality of gearings in response to a secondary user input.

In yet another embodiment, a computer implemented method for enabling user controlled application of gearing parameters to interactive components of a computer program is disclosed. In this method, a operation provides an input device for accepting user input and transmitting user input to a computer system that is at least partially executing the computer program. The input device is used to enable the application of one or more gearing ratios associated with interactive components of the computer program. In another operation, the method receives a gearing trigger from the input device, the gearing trigger being a particular type of user input. In yet another operation, the method looks up a gearing parameter associated with the gearing trigger. The gearing parameter stored in a first memory associated with the computer system and defining a scaling ratio between the user input and a rate at which the interactive component reacts during execution of the computer program. Another operation of the method is to copy the gearing parameter from a first memory to a second memory, the second memory used to store an applied gearing parameter. In yet another operation, the method executes the computer program using the applied gearing parameter obtained from the second memory. Then, subsequent user input responds according to the scaling ratio between the user input and the rate at which the interactive component reacts during execution of the computer program.

In still a further embodiment, a computer implemented method for changing responses of interactive components of a computer game program is disclosed. The method includes an operation that provides an input device for accepting user input and transmitting user input to a computer system at least partially executing the computer game program. The input device is capable of detecting translational and rotational movements in three orthogonal axes. The method also includes an operation that maps user input to control interactive components of the computer game program. In another operation, the method detects user input to apply a gearing parameter to a particular interactive component. In yet another operation, the method looks up the gearing parameter associated with the user input. The gearing parameter stored in a first memory associated with the computer system and defining a scaling ratio between the user input and a rate at which the interactive component reacts during execution of the computer program. The method also includes an operation that copies the gearing parameter from a stored memory to an active memory, the active memory holding an applied gearing parameter. In still another operation, the method executes the computer program using the applied gearing parameter on subsequent user input.

The advantages of the present invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

FIGS. 9 and 10 show an exemplary controller that can be used to interactively change a gearing ratio, in accordance with one embodiment of the present invention.

FIG. 11 shows an exemplary application for controller of FIGS. 9 and 10, in accordance with one embodiment of the present invention.

FIG. 12 shows an exemplary software controlled gearing amount for the application shown in FIG. 11.

FIG. 20A shows a diagram illustrating changes in gearing ratios based on various user input, in accordance with one embodiment of the present invention.

DETAILED DESCRIPTION

Figure 1:
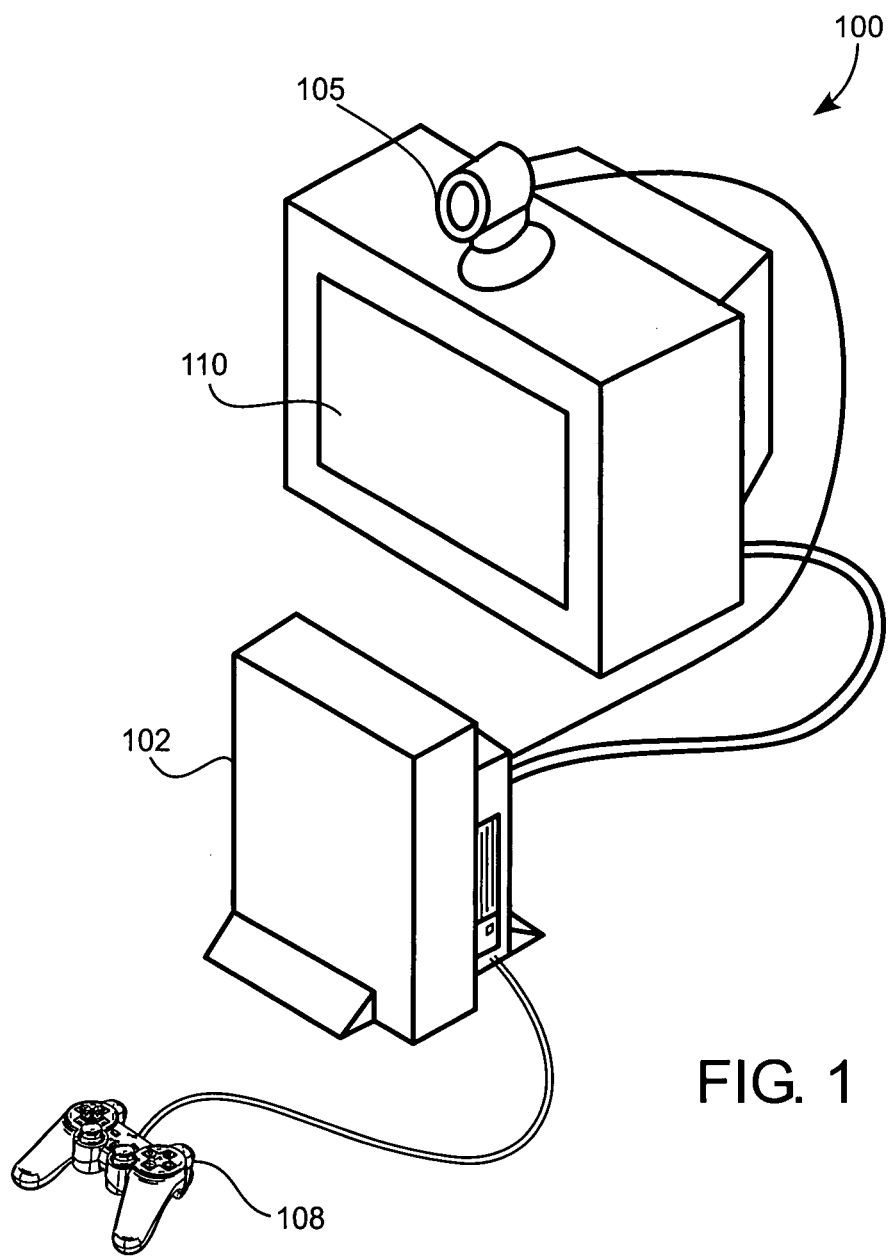
FIG. 1 illustrates an interactive game setup, in accordance with one embodiment of the present invention.

In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to obscure the present invention.

The technology described herein can be used to provide actively geared inputs for an interaction with a computer program. Gearing, in the general and broadest sense, can be defined an input that can have varying degrees in magnitude and/or time. The degree of gearing can then be communicated to a computing system. The degree of gearing may be applied to a process executed by the computing system. By analogy, a process can be imaged as a bucket of fluid having an input and an output. The bucket of fluid is a process that is executing on a system, and the gearing therefore controls an aspect of the processing performed by the computing system. In one example, the gearing can control the rate at which the fluid is emptied from the fluid bucket relative to an input amount, which might be thought of as drops of fluid going into the bucket. Thus, the fill rate may be dynamic, the drain rate may be dynamic, and the drain rate might be impacted by the gearing. The gearing can thus be adjusted or timed so as to tune a changing value that may be streaming to a program, such as a game program. The gearing may also impact a counter, such as a moving data counter that then controls an action by a processor or eventually a game element, object, player, character, etc.

Taking this analogy to a more tangible computing example, the rate at which the fluid is emptied might be the rate at which control is passed to or executed by a feature of a computer program, in response to some input plus gearing. The feature of the computer program may be an object, a process, a variable, or predefined/custom algorithm, character, game player, mouse (2D or 3D), etc. The result of the processing, which may have been altered by the gearing, can be conveyed to an observer in any number of ways. One way may be visually on a display screen, audibly via sound, vibration acoustics via feel, a combination thereof, etc., or simply by the modified response of processing for an interactive element of a game or program.

The input can be obtained by tracking performed via: (1) a image analysis, (2) an inertial analysis, (3) acoustic analysis, or hybrid Mixed analysis of (1), (2) or (3). Various examples are provided regarding image analysis and applied gearing, but it should be understood that the tracking is not limited to video, but can accomplished by numerous ways, and in particular, by inertial analysis, acoustic analysis, mixtures of these and other suitable analyzers.

In various embodiments, a computer or gaming system having a video camera (e.g., image analysis) can process image data and identify various actions taking place in a zone of focus or given volume that may be in front of the video camera. Such actions typically include moving or rotating the object in three dimensional space or actuating any of a variety of controls such as buttons, dials, joysticks, etc. In addition to these techniques, the present technology further provides the additional functionality of adjusting a scaling factor, referred to herein as gearing, to adjust the sensitivity of the input with respect to one or more corresponding actions on a display screen or a feature of a program. For instance, the actions on the display screen may be of an object that may be the focus of a video game. The object may also be a feature of a program, such as a variable, a multiplier, or a computation that will then be rendered as sound, vibration, images on a display screen or a combination of the these and other representations of the geared output.

In another embodiment, gearing can be applied to a feature of a computer program, and detection of an input device can be based on processing by an inertial analyzer. The inertial analyzer will track an input device for inertial activity, and the inertial analyzer can then convey the information to a program. The program will then take the output from the inertial analyzer so that a gearing amount can be applied to the output. The gearing amount will then dictate a degree or ratio by which a program will compute an operation. The operation can take on any number of forms, and one example of the operation can be to generate a noise, a variable nose, vibration, a movement by an object, or computation by a program that then outputs a visible and/or audible result. If the output is a variable, the variable may be used to complete the execution of a process, such that the process will take into account the amount of gearing. The amount of gearing can be preset, set dynamically by the user or adjusted on demand.

Various types of inertial sensor devices may be used to provide information on 6-degrees of freedom (e.g., X, Y and Z translation (e.g., acceleration) and rotation about X, Y and Z axes). Examples of suitable inertial sensors for providing information on 6-degrees of freedom include accelerometers, one or more single axis accelerometers, mechanical gyroscopes, ring laser gyroscopes or combinations of two or more of these.

Signals from the sensor(s) may be analyzed to determine the motion and/or orientation of the controller during play of a video game according to an inventive method. Such a method may be implemented as a series of processor executable program code instructions stored in a processor readable medium and executed on a digital processor. For example, a video game system may include one or more processors. Each processor may be any suitable digital processor unit, e.g., a microprocessor of a type commonly used in video game consoles or custom designed multi-processor cores. In one embodiment, the processor may implement an inertial analyzer through execution of processor readable instructions. A portion of the instructions may be stored in a memory. Alternatively, the inertial analyzer may be implemented in hardware, e.g., as an application specific integrated circuit (ASIC) or digital signal processor (DSP). Such analyzer hardware may be located on the controller or on the console or may be remotely located elsewhere. In hardware implementations, the analyzer may be programmable in response to external signals e.g., from the processor or some other remotely located source, e.g., connected by USB cable, Ethernet, over a network, the Internet, short range wireless connection, broadband wireless, Bluetooth, or a local network.

The inertial analyzer may include or implement instructions that analyze the signals generated by the inertial sensors and utilize information regarding position and/or orientation of a controller. The inertial sensor signals may be analyzed to determine information regarding the position and/or orientation of the controller. The position and or orientation information may be utilized during play of a video game with the system.

In one embodiment, a game controller may include one or more inertial sensors, which may provide position and/or orientation information to a processor via an inertial signal. Orientation information may include angular information such as a tilt, roll or yaw of the controller. As noted above, and by way of example, the inertial sensors may include any number and/or combination of accelerometers, gyroscopes or tilt sensors. In a one embodiment, the inertial sensors include tilt sensors adapted to sense orientation of the joystick controller with respect to tilt and roll axes, a first accelerometer adapted to sense acceleration along a yaw axis and a second accelerometer adapted to sense angular acceleration with respect to the yaw axis. An accelerometer may be implemented, e.g., as a MEMS device including a mass mounted by one or more springs with sensors for sensing displacement of the mass relative to one or more directions. Signals from the sensors that are dependent on the displacement of the mass may be used to determine an acceleration of the joystick controller. Such techniques may be implemented by instructions from the game program or general program, which may be stored in memory and executed by a processor.

By way of example an accelerometer suitable as an inertial sensor may be a simple mass elastically coupled at three or four points to a frame, e.g., by springs. Pitch and roll axes lie in a plane that intersects the frame, which is mounted to the joystick controller. As the frame (and the joystick controller) rotates about pitch and roll axes the mass will displace under the influence of gravity and the springs will elongate or compress in a way that depends on the angle of pitch and/or roll. The displacement and of the mass can be sensed and converted to a signal that is dependent on the amount of pitch and/or roll. Angular acceleration about the yaw axis or linear acceleration along the yaw axis may also produce characteristic patterns of compression and/or elongation of the springs or motion of the mass that can be sensed and converted to signals that are dependent on the amount of angular or linear acceleration. Such an accelerometer device can measure tilt, roll angular acceleration about the yaw axis and linear acceleration along the yaw axis by tracking movement of the mass or compression and expansion forces of the springs. There are a number of different ways to track the position of the mass and/or or the forces exerted on it, including resistive strain gauge material, photonic sensors, magnetic sensors, hall-effect devices, piezoelectric devices, capacitive sensors, and the like.

In addition, light sources may provide telemetry signals to the processor, e.g., in pulse code, amplitude modulation or frequency modulation format. Such telemetry signals may indicate which buttons are being pressed and/or how hard such buttons are being pressed. Telemetry signals may be encoded into the optical signal, e.g., by pulse coding, pulse width modulation, frequency modulation or light intensity (amplitude) modulation. The processor may decode the telemetry signal from the optical signal and execute a game command in response to the decoded telemetry signal. Telemetry signals may be decoded from analysis of images of the joystick controller obtained by an image capture unit. Alternatively, an apparatus may include a separate optical sensor dedicated to receiving telemetry signals from the lights sources.

A processor may use inertial signals from the inertial sensor in conjunction with optical signals from light sources detected by an image capture unit and/or sound source location and characterization information from acoustic signals detected by a microphone array to deduce information on the location and/or orientation of a controller and/or its user. For example, "acoustic radar" sound source location and characterization may be used in conjunction with a microphone array to track a moving voice while motion of the joystick controller is independently tracked (through inertial sensors and or light sources). In acoustic radar, a pre-calibrated listening zone is selected at runtime and sounds originating from sources outside the pre-calibrated listening zone are filtered out. The pre-calibrated listening zones may include a listening zone that corresponds to a volume of focus or field of view of the image capture unit.

In one embodiment, the tracking can be by way of an acoustic analyzer. The acoustic analyzer is configured to receive acoustic signals from an input device, and the acoustic analyzer can convey a gearing amount to be applied to the command or interaction being performed. The acoustic analyzer can be in the form of a computer program segment(s) or specifically defined on a circuit that is designed to process acoustic signal information. The acoustic signal information can therefore include gearing data that may be dynamically set by a program, set on-demand by the user through the input device (e.g., by selecting a button on a controller, a voice command, or the like). An example acoustic analyzer is described in U.S. patent application Ser. No. 11/381,721, filed May 4, 2006 entitled "SELECTIVE SOUND SOURCE LISTENING IN CONJUNCTION WITH COMPUTER INTERACTIVE PROCESSING", by inventors Xiadong Mao, Richard L. Marks and Gary, M. Zalewski, the entire disclosure of which is hereby incorporated herein by reference.

The Analyzers can be configured with a mapping chain. Mapping chains can be swapped out by the game during game-play as can settings to the Analyzer and to the Mixer.

In one embodiment, the tracking of the input device may by through an image analyzer. The image analyzer, as will be discussed further below, can include a camera that captures images of a space where a user and an input device are located. In this example, the image analyzer is determining position of the controller to cause some respective action to a feature of a processing program. The program may be a game, and the feature may be an object that is being controlled by the input device. The image analyzer is further configured to mix the position data with an input gearing value. The gearing value can be provided by the user dynamically during execution or can be set by a program depending on activity within an execution session. The gearing input will set a relative impact on some processing by the computer program based on an input gesture or action by the user. In one embodiment, the gearing will translate a command or action from a user or user input device to a feature of a program. The feature of the program need not be an object that is visible, but can also include the adjustment of a variable used to calculate some parameter, estimation or translation of either sound, vibration or image movement. Gearing will therefore provide an additional sense of control to the interactivity provided to and with a program and features of the program.

In still another embodiment, a mixer analyzer is provided. The Mixer analyzer is designed to generate a hybrid effect to a feature of the game. For instance, the Mixer analyzer can take input from a combination of the image analyzer, the acoustic analyzer, the inertial analyzer, and the like. The Mixer analyzer can therefore, in one embodiment, receive several gearing variables, which can then be mixed and synthesized to generate a hybrid result, command or interaction with a feature of a program. Again, the feature of the program should be broadly understood to include visual and non-visual objects, variables used in the processing of an operation, adjustments to audible reactions, and the like.

FIG. 1 illustrates an interactive game setup 100, in accordance with one embodiment of the present invention. The interactive game setup 100 includes a computer 102, also referred to herein as "console," that is coupled to a display screen 110. An image capture device 105 may be placed on top of the display screen 110 and is coupled to the computer 102. Computer 102 is, in one embodiment, a gaming system console which allows users to play video games and interface with the video games through controllers 108. The computer 102 may also be connected to the internet, to allow for interactive on-line gaming. The image capture device 105 is shown placed on top of the display screen 110, but it should be understood that the image capture device 105 can be placed in any other proximate location that will allow it to capture images that are located about in front of the display screen 110. Techniques for capturing these movements and interactions can vary, but exemplary techniques are described in United Kingdom Applications GB 0304024.3 (PCT/GB2004/000693) and GB 0304022.7 (PCT/GB2004/000703), each filed on Feb. 21, 2003, and each of which is hereby incorporated by reference.

In one embodiment, image capture device 105 can be as simple as a standard web cam or can include more advanced technology. Image capture device 105 may be capable of capturing images, digitizing the images, and communicating the image data back to the computer 102. In some embodiments, the image capture device will have logic integrated therein for performing the digitizing and another embodiment the image capture device 105 will simply transmit an analog video signal to the computer 102 for digitizing. In either case, the image capture device 105 is capable of capturing either color or black and white images of any object located in front of the image capture device 105.

Figure 2:
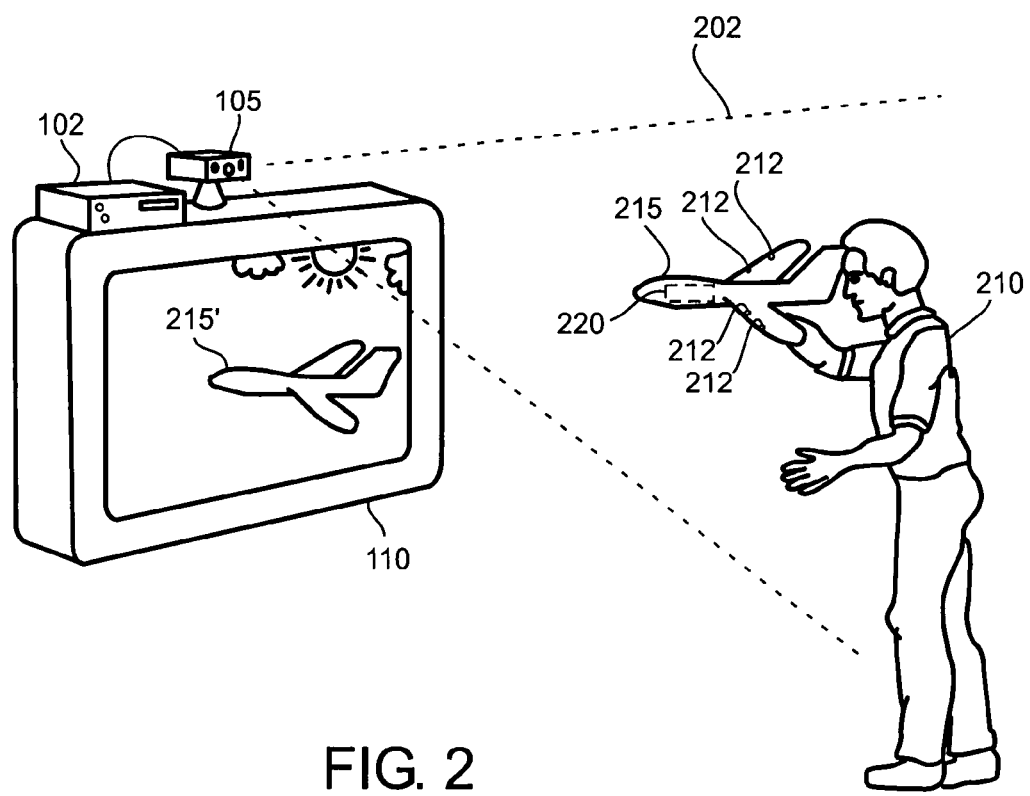
FIG. 2 illustrates an exemplary computer interaction using an image capture and processing system, in accordance with one embodiment of the present invention.

FIG. 2 illustrates an exemplary computer interaction using an image capture and processing system, in accordance with one embodiment of the present invention. Computer 102 receives image data from image capture device 105 which generates images from view 202. View 202 includes a user 210 manipulating an object 215 in the shape of a toy airplane. Object 215 includes a plurality of LEDs 212 which are viewable by image capture device 105. LEDs 212 provide location and orientation information of object 215. In addition, object 215 may include one or more actuating elements, such as a button, trigger, dial, etc., for generating computer input. Voice commands may also be used. In one embodiment, object 215 includes a circuit 220 containing logic for modulating LEDs 212 for transmitting data to computer 102 via image capture device 105. The data may include encoded commands generated in response to manipulations of the actuating means. As object 215 is moved and rotated in three dimensional space viewable by image capture device 105, LED positions as represented in image data are translated as described hereinafter with reference to FIGS. 3-6 to coordinates within the three-dimensional space, the coordinates describing both position information in terms of x, y, and z coordinates, as well as orientation information, in terms of $\alpha$, $\beta$, and $\gamma$ values. The coordinates are forwarded to a computer application which may be an airplane game in which the toy airplane is represented on display 110 as a real or animated airplane 215' which may be performing various stunts in response to manipulation of toy airplane 215. Alternatively, instead of the toy airplane 215, the user 210 may be handling a controller 108 (shown in FIG. 1) and movement of the controller 108 can be tracked and commands captured to cause the movement of an object on the display screen.

In one embodiment, the user 210 may also select to change or modify the degree of interactivity with the animated airplane 215'. The degree of interactivity may be modified by allowing the user 215 to adjust a "gearing" component that will adjust an amount by which movement by the user's controller 108 (or toy airplane 215) will be mapped to movement by the animated airplane 215'. Depending on the gearing, which can be dynamically set, preset for the game or adjusted during game play by the user 210, the response mapped to the animated airplane 215' (e.g., video game object) will change to provide for another level of user interactivity and an enhanced experience. Further details regarding the gearing will be provided below with reference to FIGS. 7-20.

Figure 3:
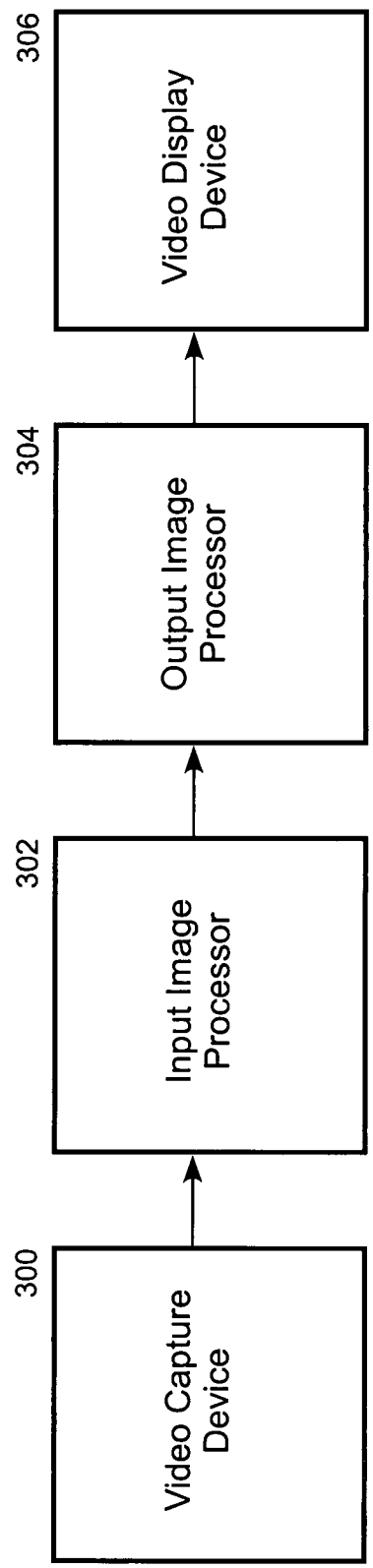
FIG. 3 is a block diagram of an exemplary user input system for interaction with an object on a graphical display that can be used to implement embodiments of the present invention.

FIG. 3 is a block diagram of an exemplary user input system for interaction with an object on a graphical display that can be used to implement embodiments of the present invention. As shown in FIG. 3, the user input system is comprised of a video capture device 300, an input image processor 302, an output image processor 304, and a video display device 306. Video capture device 300 may be any device capable of capturing sequences of video images, and, in one embodiment, is a digital video camera (such as a "web-cam"), or similar image capturing device.

The video capture device 300 may be configured to provide depth image. In the this description, the terms "depth camera" and "three-dimensional camera" refer to any camera that is capable of obtaining distance or depth information as well as two-dimensional pixel information. For example, a depth camera can utilize controlled infrared lighting to obtain distance information. Another exemplary depth camera can be a stereo camera pair, which triangulates distance information using two standard cameras. Similarly, the term "depth sensing device" refers to any type of device that is capable of obtaining distance information as well as two-dimensional pixel information.

Camera 300 can therefore provide the ability to capture and map the third-dimension in addition to normal two-dimensional video imagery. Similar to normal cameras, a depth camera captures two-dimensional data for a plurality of pixels that comprise the video image. These values are color values for the pixels, generally red, green, and blue (RGB) values for each pixel. In this manner, objects captured by the camera appear as two-dimension objects on a monitor. However, unlike a conventional camera, a depth camera also captures the z-components of the scene, which represent the depth values for the scene. Since the depth values are typically assigned to the z-axis, the depth values are often referred to as z-values.

In operation, a z-value is captured for each pixel of the scene. Each z-value represents a distance from the camera to a particular object in the scene corresponding to the related pixel. In addition, a maximum detection range is defined beyond which depth values will not be detected. This maximum range plane can be utilized by the embodiments of the present invention to provide user defined object tracking. Thus, using a depth camera, each object can be tracked in three dimensions. As a result, a computer system of the embodiments of the present invention can utilize the z-values, along with the two-dimensional pixel data, to create an enhanced three-dimensional interactive environment for the user. For more information on depth analysis, reference may be made to U.S. patent application Ser. No. 10/448,614, entitled System and Method for Providing a Real-time three dimensional interactive environment, having a filing date of May 29, 2003, which is incorporated herein by reference.

Although a depth camera may be used in accordance with one embodiment, it should not be construed as being necessary to identify a location of position and coordinates of an object in three dimensional space. For example, in the scenario depicted in FIG. 2, the distance between object 215 and camera 105 can be inferred by measuring the distance of left most and right most LEDs 212. The closer together LEDs 212 show up on an image generated by image capture device 105, the farther away object 215 will be from camera 105. Thus, a reasonably accurate inference of z-axis coordinates can be made from two dimensional images generated by a typical digital camera.

Returning to FIG. 3, input image processor 302 translates the captured video images (which may be depth images) of the control object into signals that are delivered to an output image processor. In one embodiment, input image processor 302 is programmed to isolate the control object from the background in the captured video image through the depth information and generate an output signal responsive to the position and/or movement of the control object. The output image processor 304 is programmed to effect translational and/or rotational movement of an object on the video display device 306 in response to signals received from the input image processor 302.

These and additional aspects of the present invention may be implemented by one or more processors which execute software instructions. According to one embodiment of the present invention, a single processor executes both input image processing and output image processing. However, as shown in the figures and for ease of description, the processing operations are shown as being divided between an input image processor 302 and an output image processor 304. It should be noted that the invention is in no way to be interpreted as limited to any special processor configuration, such as more than one processor. The multiple processing blocks shown in FIG. 3 are shown only for convenience of description.

Figure 4:
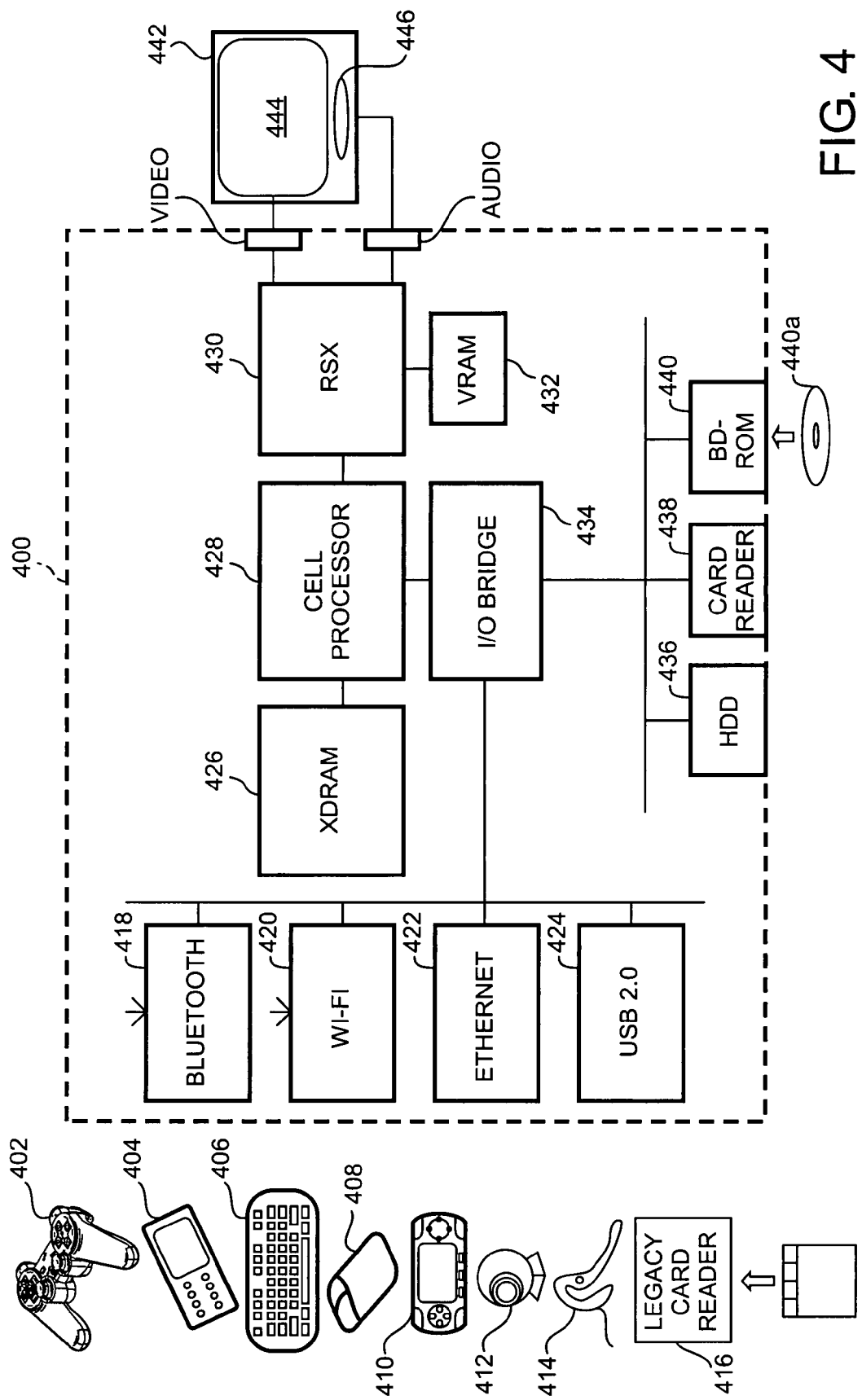
FIG. 4 is a simplified block diagram of a computer processing system configured to implement the embodiments of the invention described herein.
Figure 5:
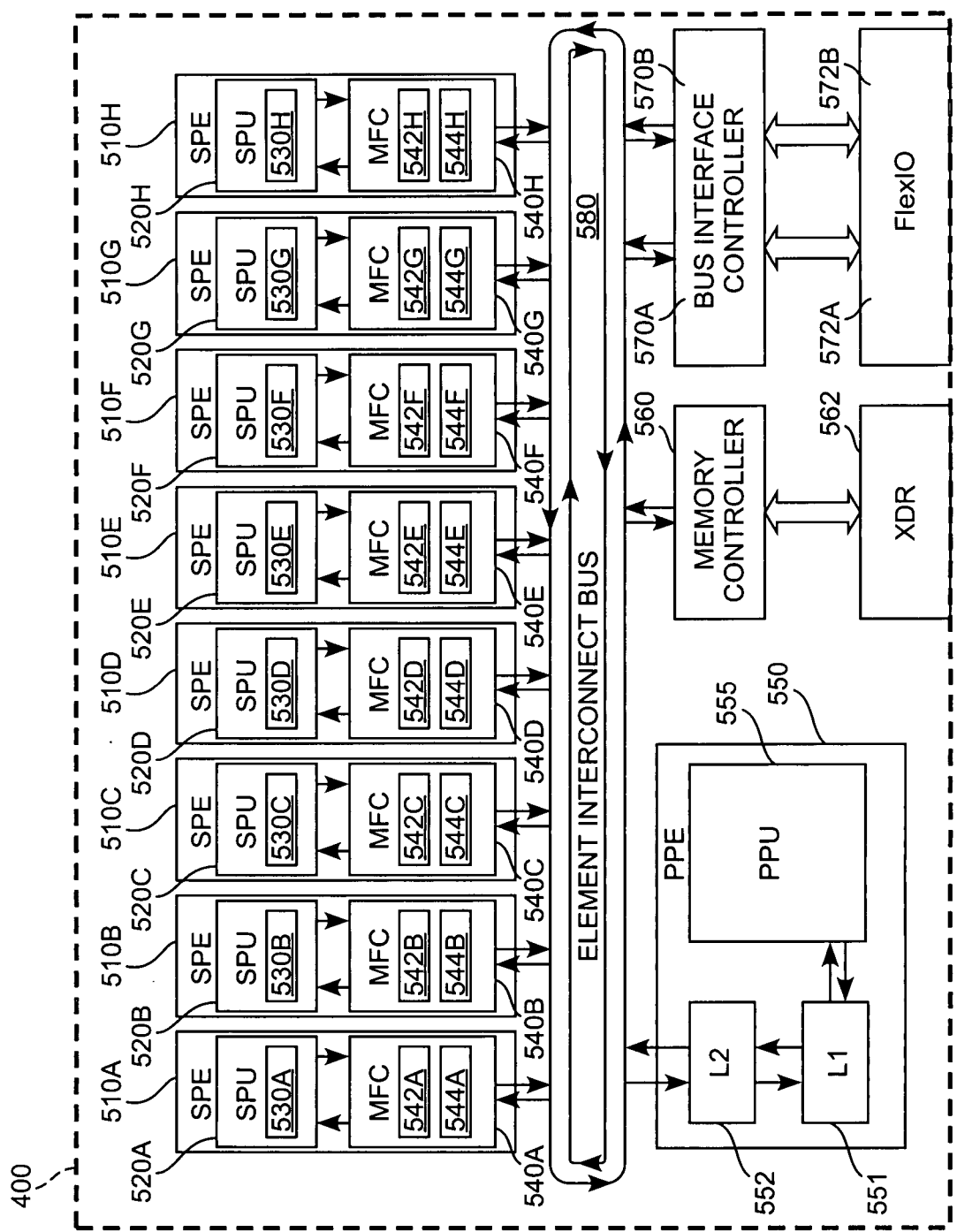
FIG. 5 is a block diagram of a configuration of the components of a video game console adapted for use with a manipulated object serving as an alternative input device in accordance with one embodiment of the present invention

FIG. 4 schematically illustrates the overall system architecture of the Sony® Playstation 3® entertainment device, a console that may be compatible with controllers for implementing user controlled selective gearing in accordance with one embodiment of the present invention. A system unit 400 is provided, with various peripheral devices connectable to the system unit 400. The system unit 400 comprises: a Cell processor 428; a Rambus® dynamic random access memory (XDRAM) unit 426; a Reality Synthesizer graphics unit 430 with a dedicated video random access memory (VRAM) unit 432; and an I/O bridge 434. The system unit 400 also comprises a Blu Ray® Disk BD-ROM® optical disk reader 440 for reading from a disk 440a and a removable slot-in hard disk drive (HDD) 436, accessible through the I/O bridge 434. Optionally the system unit 400 also comprises a memory card reader 438 for reading compact flash memory cards, Memory Stick® memory cards and the like, which is similarly accessible through the I/O bridge 434.

The I/O bridge 434 also connects to six Universal Serial Bus (USB) 2.0 ports 424; a gigabit Ethernet port 422; an IEEE 802.11b/g wireless network (Wi-Fi) port 420; and a Bluetooth® wireless link port 418 capable of supporting of up to seven Bluetooth connections.

In operation the I/O bridge 434 handles all wireless, USB and Ethernet data, including data from one or more game controllers 402. For example when a user is playing a game, the I/O bridge 434 receives data from the game controller 402 via a Bluetooth link and directs it to the Cell processor 428, which updates the current state of the game accordingly.

The wireless, USB and Ethernet ports also provide connectivity for other peripheral devices in addition to game controllers 402, such as: a remote control 404; a keyboard 406; a mouse 408; a portable entertainment device 410 such as a Sony Playstation Portable® entertainment device; a video camera such as an EyeToy® video camera 412; and a microphone headset 414. In some embodiments, the Ethernet ports allows the Playstation 3 to be connected to a computer network. As part of a computer network, the Playstation 3 can execute software that enables the Playstation 3 to interact with other Playstation 3 devices or other hardware executing compatible software. In one embodiment, networked Playstation 3 devices can collectively process software distributed across multiple Playstation 3 devices, servers, and/or clients as further disclosed in U.S. patent application Ser. No. 10/211,075, entitled "CONFIGURATION SWITCHING DYNAMICALLY CHANGING BETWEEN NETWORK COMMUNICATION ARCHITECTURES", filed on Jul. 31, 2002.

Such peripheral devices may therefore in principle be connected to the system unit 400 wirelessly; for example the portable entertainment device 410 may communicate via a Wi-Fi ad-hoc connection, whilst the microphone headset 414 may communicate via a Bluetooth link.

The provision of these interfaces means that the Playstation3® device is also potentially compatible with other peripheral devices such as digital video recorders (DVRs), set-top boxes, digital cameras, portable media players, Voice over IP telephones, mobile telephones, printers and scanners. In addition, a legacy memory card reader 416 may be connected to the system unit via a USB port 424, enabling the reading of memory cards 448 of the kind used by the Playstation® or Playstation 2® devices.

In the present embodiment, the game controller 402 is operable to communicate wirelessly with the system unit 400 via the Bluetooth link. However, the game controller 402 can instead be connected to a USB port, thereby also providing power by which to charge the battery of the game controller 402. In addition to one or more analog joysticks and conventional control buttons, the game controller is sensitive to motion in six degrees of freedom, corresponding to translation and rotation in each axis. Consequently gestures and movements by the user of the game controller may be translated as inputs to a game in addition to or instead of conventional button or joystick commands. Optionally, other wirelessly enabled peripheral devices such as the Playstation™ Portable device may be used as a controller. In the case of the Playstation™ Portable device, additional game or control information (for example, control instructions or number of lives) may be provided on the screen of the device. Other alternative or supplementary control devices may also be used, such as a dance mat (not shown), a light gun (not shown), a steering wheel and pedals (not shown) or bespoke controllers, such as a single or several large buttons for a rapid-response quiz game (also not shown).

The remote control 404 is also operable to communicate wirelessly with the system unit 400 via a Bluetooth link. The remote control 404 comprises controls suitable for the operation of the Blu Ray™ Disk BD-ROM reader 440 and for the navigation of disk content.

The Blu Ray™ Disk BD-ROM reader 440 is operable to read CD-ROMs compatible with the Playstation and PlayStation 2 devices, in addition to conventional pre-recorded and recordable CDs, and so-called Super Audio CDs. The reader 440 is also operable to read DVD-ROMs compatible with the Playstation 2 and PlayStation 3 devices, in addition to conventional pre-recorded and recordable DVDs. The reader 440 is further operable to read BD-ROMs compatible with the Playstation 3 device, as well as conventional pre-recorded and recordable Blu-Ray Disks.

The system unit 400 is operable to supply audio and video, either generated or decoded by the Playstation 3 device via the Reality Synthesizer graphics unit 430, through audio and video connectors to a display and sound output device 442 such as a monitor or television set having a display 444 and one or more loudspeakers 446. The audio connectors 450 may include conventional analogue and digital outputs whilst the video connectors 452 may variously include component video, S-video, composite video and one or more High Definition Multimedia Interface (HDMI) outputs. Consequently, video output may be in formats such as PAL or NTSC, or in 720p, 10801 or 1080p high definition.

Audio processing (generation, decoding and so on) is performed by the Cell processor 428. The Playstation3® device's operating system supports Dolby® 5.1 surround sound, Dolby® Theatre Surround (DTS), and the decoding of 7.1 surround sound from Blu-Ray® disks.

In the present embodiment, the video camera 412 comprises a single charge coupled device (CCD), an LED indicator, and hardware-based real-time data compression and encoding apparatus so that compressed video data may be transmitted in an appropriate format such as an intra-image based MPEG (motion picture expert group) standard for decoding by the system unit 400. The camera LED indicator is arranged to illuminate in response to appropriate control data from the system unit 400, for example to signify adverse lighting conditions. Embodiments of the video camera 412 may variously connect to the system unit 400 via a USB, Bluetooth or Wi-Fi communication port. Embodiments of the video camera may include one or more associated microphones and also be capable of transmitting audio data. In embodiments of the video camera, the CCD may have a resolution suitable for high-definition video capture. In use, images captured by the video camera may for example be incorporated within a game or interpreted as game control inputs.

In general, in order for successful data communication to occur with a peripheral device such as a video camera or remote control via one of the communication ports of the system unit 400, an appropriate piece of software such as a device driver should be provided. Device driver technology is well-known and will not be described in detail here, except to say that the skilled man will be aware that a device driver or similar software interface may be required in the present embodiment described.

Figure 15:
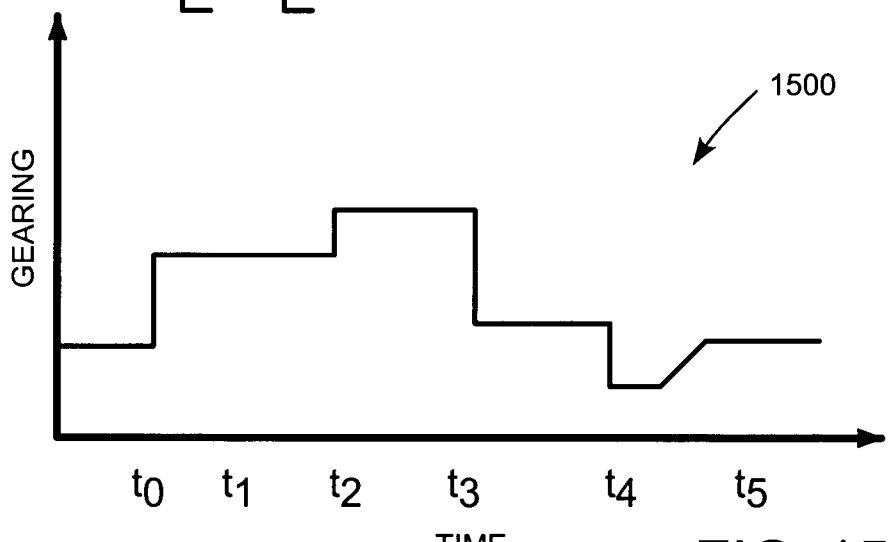
FIG. 15 shows graph depicting an exemplary gearing amount at different times t1-t5 along the length of the swing, in accordance with one embodiment of the present invention

Referring now to FIG. 15, the Cell processor 428 has an architecture comprising four basic components: external input and output structures comprising a memory controller 560 and a dual bus interface controller 570A,B; a main processor referred to as the Power Processing Element 550; eight co-processors referred to as Synergistic Processing Elements (SPEs) 510A-H; and a circular data bus connecting the above components referred to as the Element Interconnect Bus 580. The total floating point performance of the Cell processor is 218 GFLOPS, compared with the 6.2 GFLOPs of the Playstation 2 device's Emotion Engine.

The Power Processing Element (PPE) 550 is based upon a two-way simultaneous multithreading Power 1470 compliant PowerPC core (PPU) 555 running with an internal clock of 3.2 GHz. It comprises a 512 kB level 2 (L2) cache and a 32 kB level 1 (L1) cache. The PPE 550 is capable of eight single position operations per clock cycle, translating to 25.6 GFLOPs at 3.2 GHz. The primary role of the PPE 550 is to act as a controller for the Synergistic Processing Elements 510A-H, which handle most of the computational workload. In operation the PPE 550 maintains a job queue, scheduling jobs for the Synergistic Processing Elements 510A-H and monitoring their progress. Consequently each Synergistic Processing Element 510A-H runs a kernel whose role is to fetch a job, execute it and synchronized with the PPE 550.

Each Synergistic Processing Element (SPE) 510A-H comprises a respective Synergistic Processing Unit (SPU) 520A-H, and a respective Memory Flow Controller (MFC) 540A-H comprising in turn a respective Dynamic Memory Access Controller (DMAC) 542A-H, a respective Memory Management Unit (MMU) 544A-H and a bus interface (not shown). Each SPU 520A-H is a RISC processor clocked at 3.2 GHz and comprising 256 kB local RAM 530A-H, expandable in principle to 4 GB. Each SPE gives a theoretical 25.6 GFLOPS of single precision performance. An SPU can operate on 4 single precision floating point members, 4 32-bit numbers, 8 16-bit integers, or 16 8-bit integers in a single clock cycle. In the same clock cycle it can also perform a memory operation. The SPU 520A-H does not directly access the system memory XDRAM 426; the 64-bit addresses formed by the SPU 520A-H are passed to the MFC 540A-H which instructs its DMA controller 542A-H to access memory via the Element Interconnect Bus 580 and the memory controller 560.

The Element Interconnect Bus (EIB) 580 is a logically circular communication bus internal to the Cell processor 428 which connects the above processor elements, namely the PPE 550, the memory controller 560, the dual bus interface 570A,B and the 8 SPEs 510A-H, totaling 12 participants. Participants can simultaneously read and write to the bus at a rate of 8 bytes per clock cycle. As noted previously, each SPE 510A-H comprises a DMAC 542A-H for scheduling longer read or write sequences. The EIB comprises four channels, two each in clockwise and anti-clockwise directions. Consequently for twelve participants, the longest step-wise data-flow between any two participants is six steps in the appropriate direction. The theoretical peak instantaneous EIB bandwidth for 12 slots is therefore 96B per clock, in the event of full utilization through arbitration between participants. This equates to a theoretical peak bandwidth of 307.2 GB/s (gigabytes per second) at a clock rate of 3.2 GHz.

The memory controller 560 comprises an XDRAM interface 562, developed by Rambus Incorporated. The memory controller interfaces with the Rambus XDRAM 426 with a theoretical peak bandwidth of 25.6 GB/s.

The dual bus interface 570A,B comprises a Rambus FlexIO® system interface 572A,B. The interface is organized into 12 channels each being 8 bits wide, with five paths being inbound and seven outbound. This provides a theoretical peak bandwidth of 62.4 GB/s (36.4 GB/s outbound, 26 GB/s inbound) between the Cell processor and the I/O Bridge 700 via controller 170A and the Reality Simulator graphics unit 200 via controller 170B.

Data sent by the Cell processor 428 to the Reality Simulator graphics unit 430 will typically comprise display lists, being a sequence of commands to draw vertices, apply textures to polygons, specify lighting conditions, and so on.

Embodiments may include capturing depth data to better identify the real-world user and to direct activity of an avatar or scene. The object can be something the person is holding or can also be the person's hand. In the this description, the terms "depth camera" and "three-dimensional camera" refer to any camera that is capable of obtaining distance or depth information as well as two-dimensional pixel information. For example, a depth camera can utilize controlled infrared lighting to obtain distance information. Another exemplary depth camera can be a stereo camera pair, which triangulates distance information using two standard cameras. Similarly, the term "depth sensing device" refers to any type of device that is capable of obtaining distance information as well as two-dimensional pixel information.

Recent advances in three-dimensional imagery have opened the door for increased possibilities in real-time interactive computer animation. In particular, new "depth cameras" provide the ability to capture and map the third-dimension in addition to normal two-dimensional video imagery. With the new depth data, embodiments of the present invention allow the placement of computer-generated objects in various positions within a video scene in real-time, including behind other objects.

Moreover, embodiments of the present invention provide real-time interactive gaming experiences for users. For example, users can interact with various computer-generated objects in real-time. Furthermore, video scenes can be altered in real-time to enhance the user's game experience. For example, computer generated costumes can be inserted over the user's clothing, and computer generated light sources can be utilized to project virtual shadows within a video scene. Hence, using the embodiments of the present invention and a depth camera, users can experience an interactive game environment within their own living room. Similar to normal cameras, a depth camera captures two-dimensional data for a plurality of pixels that comprise the video image. These values are color values for the pixels, generally red, green, and blue (RGB) values for each pixel. In this manner, objects captured by the camera appear as two-dimension objects on a monitor.

Embodiments of the present invention also contemplate distributed image processing configurations. For example, the invention is not limited to the captured image and display image processing taking place in one or even two locations, such as in the CPU or in the CPU and one other element. For example, the input image processing can just as readily take place in an associated CPU, processor or device that can perform processing; essentially all of image processing can be distributed throughout the interconnected system. Thus, the present invention is not limited to any specific image processing hardware circuitry and/or software. The embodiments described herein are also not limited to any specific combination of general hardware circuitry and/or software, nor to any particular source for the instructions executed by processing components.

With the above embodiments in mind, it should be understood that the invention may employ various computer-implemented operations involving data stored in computer systems. These operations include operations requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

The above described invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a communications network.

Figure 6:
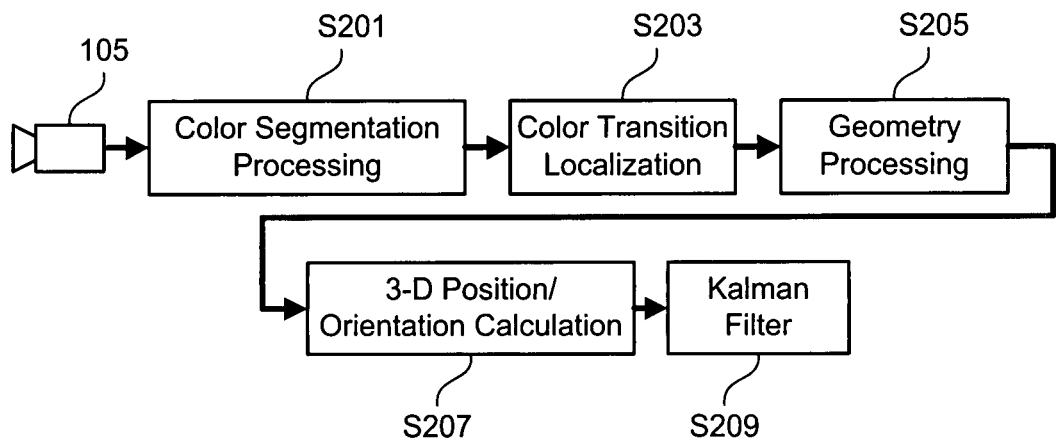
FIG. 6 is a block diagram showing the functional blocks used to track and discriminate a pixel group corresponding to the user input device as it is being manipulated by the user in accordance with one embodiment of the invention.

FIG. 6 is a block diagram showing the functional blocks used to track and discriminate a pixel group corresponding to the user input device as it is being manipulated by the user in accordance with one embodiment of the invention. It should be understood that the functions depicted by the blocks are implemented by software which is executed by the Cell Processor 428 in system unit 400 of FIG. 4. Moreover, not all of the functions indicted by the blocks in FIG. 6 are used for each embodiment.

Initially, the pixel data input from the camera is supplied to system unit 400 through the wireless, USB or Ethernet interface, enabling the following processes to be performed thereon. First, as each pixel of the image is sampled, for example, on a raster basis, a color segmentation processing step S201 is performed, whereby the color of each pixel is determined and the image is divided into various two-dimensional segments of different colors. Next, for certain embodiments, a color transition localization step S203 is performed, whereby regions where segments of different colors adjoin are more specifically determined, thereby defining the locations of the image in which distinct color transitions occur. Then, a step for geometry processing S205 is performed which, depending on the embodiment, comprises either an edge detection process or performing calculations for area statistics, to thereby define in algebraic or geometric terms the lines, curves and/or polygons corresponding to the edges of the object of interest.

The three-dimensional position and orientation of the object are calculated in step S207, according to algorithms which are to be described in association with the subsequent descriptions of preferred embodiments of the present invention. The data of three-dimensional position and orientation also undergoes a processing step S209 for Kalman filtering to improve performance. Such processing is performed to estimate where the object is going to be at a point in time, and to reject spurious measurements that could not be possible, and therefore are considered to lie outside the true data set. Another reason for Kalman filtering is that the camera 105 may produce images at 30 Hz, whereas an example display runs at 60 Hz, so Kalman filtering may fill the gaps in the data used for controlling action in the game program. Smoothing of discrete data via Kalman filtering is well known in the field of computer vision and hence will not be elaborated on further.

Figure 7:
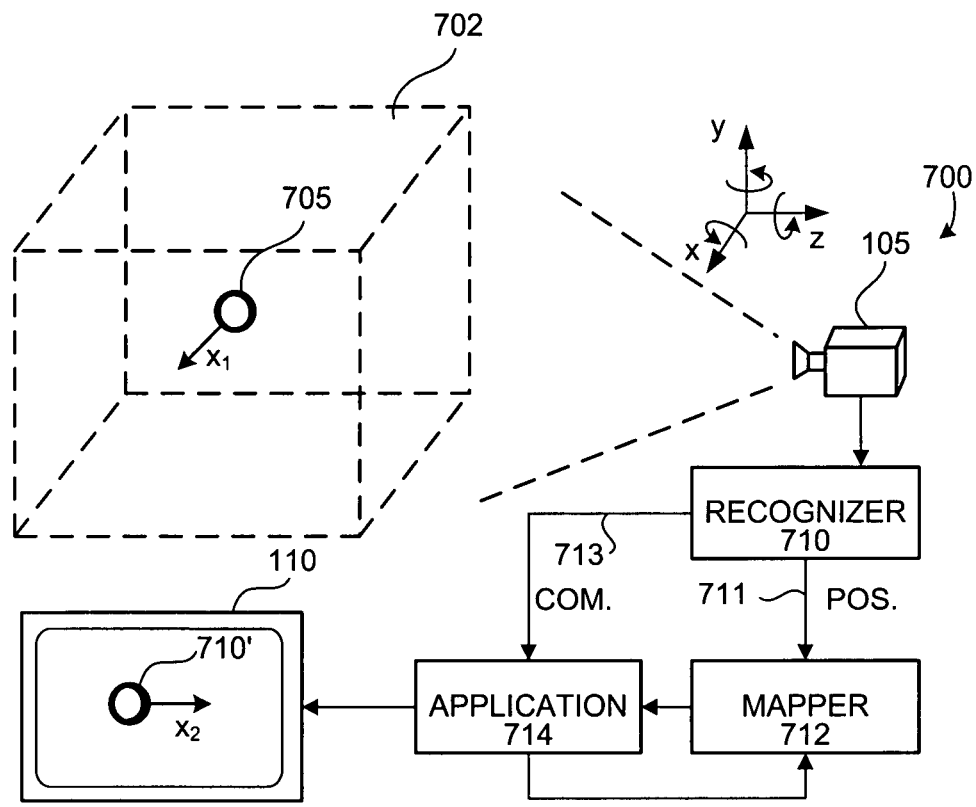
FIG. 7 shows a schematic block diagram for an exemplary image processing system for mapping movements of an object in a volume of space viewed by an image capture device, in accordance with one embodiment of the present invention.

FIG. 7 shows a schematic block diagram for an exemplary image processing system 700 for mapping movements of an object 705 in a volume of space 702 viewed by an image capture device 105, in accordance with one embodiment of the present invention. In this example, as object 705 is moved a distance $x_1$ in three dimensional space 702, image processing system 700 interprets captured video images of object 705, identifies the motion of object 705, and generates a substantially corresponding action on display screen 110.

Specifically, image capture device 105 includes a digital image sensor for generating image data representing an image formed light impacting the sensor after passing through a lens as is generally known in the art. It is also possible that image capture device 105 comprises an analog video camera generating an analog signal representing the image formed by light. In the latter case, the analog signal is converted to a digital representation of the image prior to processing by recognizer 710. Image data representing successive two dimensional images of the three dimensional space 702 is passed to recognizer 710. Recognizer 710 may, in one embodiment, perform various processing steps as described above with reference to FIG. 6 for identifying object 705. The position of object 705 is passed to mapper 712. For example, absolute coordinates of object 705 in three dimensional space 702 may be calculated and transmitted to mapper 712. Coordinates along the x and y axes may be determinable from the position of object as represented in each image. The coordinate of object 705 along the z-axis may be inferred from the size of the object. That is, the closer object 705 is to image capture device 105, the larger it will appear in the image. Thus, a measurement such as the diameter of the object as it appears in the image can be used to calculate distance from image capture device 105, and thus, the z-axis coordinate.

In addition to position information, recognizer 710 may identify commands received from object 705. Commands can be interpreted from transmissions/deformation, sound and light generation etc., of object 705, for example, as described in related U.S. patent application Ser. No. 10/207, 677, filed Jul. 27, 2002, entitled "MAN-MACHINE INTERFACE USING A DEFORMABLE DEVICE"; U.S. patent application Ser. No. 10/650,409, Filed Aug. 27, 2003, entitled "AUDIO INPUT SYSTEM"; and U.S. patent application Ser. No. 10/759,782, filed Jan. 16, 2004 entitled "METHOD AND APPARATUS FOR LIGHT INPUT DEVICE", the above listed patent applications being incorporated herein by reference in their entireties. Commands received from object 705 is interpreted by recognizer and data corresponding to the received commands may be communicated to application 714. Application 714 may be a game application or other computer application that requested or is otherwise receptive to user input from image capture device 105. In one embodiment, mapper 712 may input absolute coordinates from recognizer 710 and maps these coordinates to output coordinates that are scaled in accordance with a gearing amount. In another embodiment, mapper 712 receives successive coordinate information from recognizer 710 and converts the changes in coordinate information to vector movements of object 705. For example, if object 705 moves a distance $x_1$ from time $t_1$ to time $t_2$, then a vector $x_1,0,0$ may be generated and passed to application 714. Time $t_1$ to time $t_2$ may be the interval of time between successive frames of the video generated by image capture device 105. Mapper 712 may scale the vector according to a scaling algorithm, e.g., by multiplying the vector by a gearing amount, G. In a different embodiment, each coordinate is multiplied by a corresponding gearing factor, e.g., $G_x$, $G_y$, and $G_z$. Thus, a corresponding motion of virtual object 705' as shown in display 110, may be a distance $x_2$, which is different from $x_1$.

Application 714 may vary the gearing amount in accordance with commands 713 received from recognizer 710, or in accordance with the normal operation of the software, which may send mapper 712 gearing data causing the gearing amount to change. Gearing data may be sent to mapper 712 in response to a user command, various events, or modes of operation of application 714. Thus, the gearing amount may by varied in real time in response to user commands or as controlled by software. Mapper 712 may therefore transmit an output vector of the motion of object 705 to application 714, the output varying in relation to change in position of object 705 in space 702, and the gearing amount. Application 714, which in one embodiment is a video game, translates the output vector into a corresponding action which may then be displayed on display 110.

Figure 8:
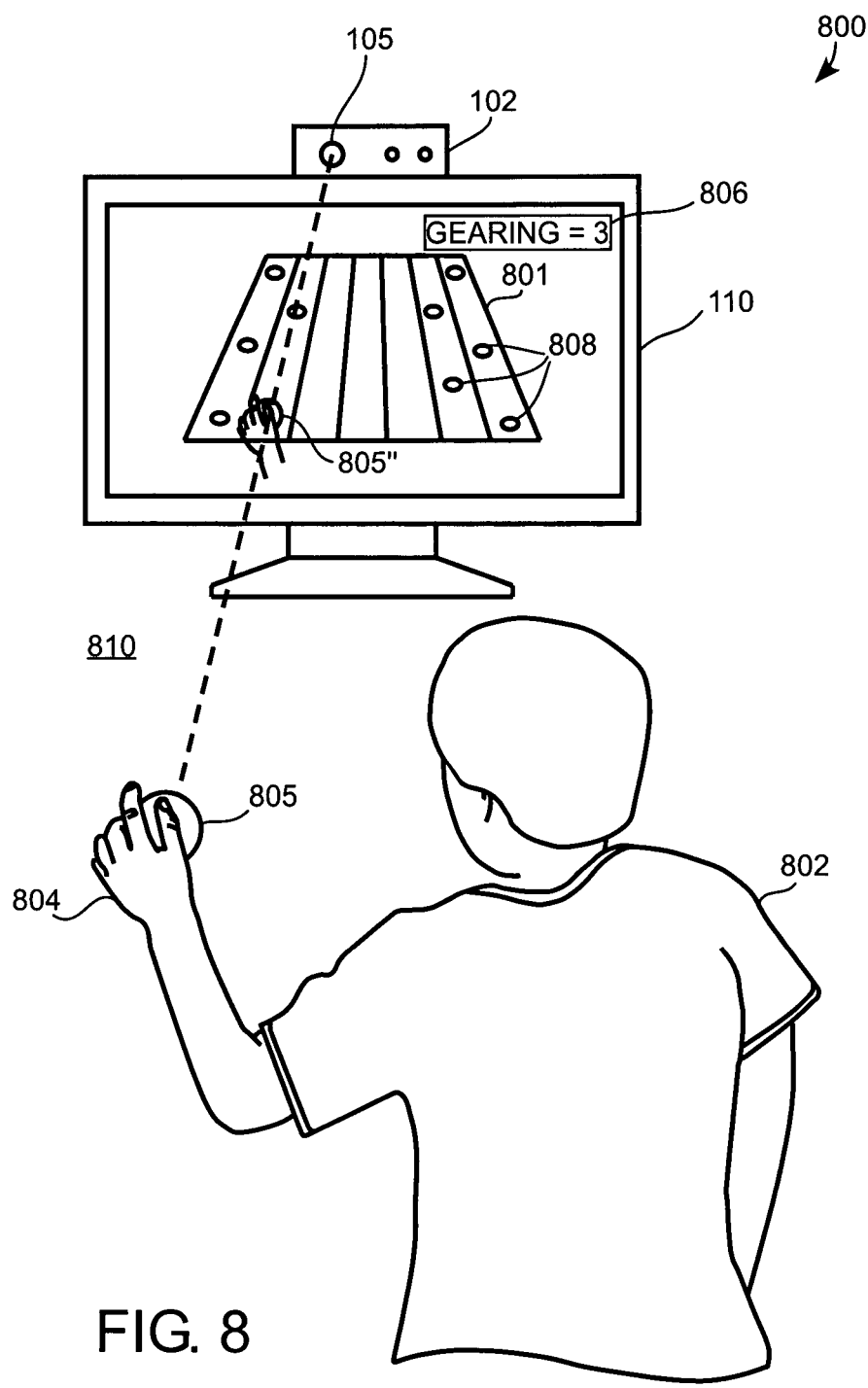
FIG. 8 illustrates an exemplary application for image processing system of FIG. 7, in accordance with one embodiment of the present invention.

FIG. 8 illustrates an exemplary application for image processing system 700 of FIG. 7, in accordance with one embodiment of the present invention. Computer system 102 includes an image capture device 105 which views scene 810. Scene 810 includes a user 802 holding an object 804 which is recognized by recognizer 710 (FIG. 7). The application program, which in this example is a checkers game, recognizes a command issuing from object 804 to pick up or drop checkers 808 on checkerboard 801. As user moves object 805 before image capture device 105, computer 102 processes images to identify motion of object 804 and translates that motion into motion of virtual object 805' on display 110. The distance virtual object 805' moves in relation to real object 805 depends on gearing amount 806. In this example, gearing amount is represented as "3" on display 110. In one embodiment, the gearing amount is user selectable. The larger the gearing amount, the smaller the movements of real object 805 is required to effectuate a particular distance move of checker 805' on the display 110.

FIGS. 9 and 10 show an exemplary controller 900 that can be used to interactively change a gearing ratio, in accordance with one embodiment of the present invention. The controller 900 may include a dedicated button 903 that can be used to interactively change a gearing ratio. A set of LEDs 904 can be associated with the gearing ratio to provide visual feedback regarding a current gearing ratio. In one embodiment, an initial pressing the dedicated button 903 will activate a first gearing ratio and illuminate a single LED. Subsequent pressing of the dedicated button 903 can progressively change the gearing ratio while illuminating an appropriate number or combination of LEDs. While FIG. 9 illustrates three LEDs, this should not be interpreted to limit the number of different gearing ratios. Additionally, it should not be construed that pressing the dedicated button 903 is the only form of user input that can interactively change the gearing ratio.

In other embodiments, alternate input can be used to interactively change the gearing ratio instead of the dedicated button 903. For example, the controller 900 can include internal inertial sensors that can detect relative translational and rotational motion of the controller 900. In another embodiment, the Controller 900 includes an interface 902 containing a plurality of interface devices including various buttons and joysticks that can be configured to interactively change the gearing ratio. The controllers discussed herein can transmit user input to a computer such as a game console using wires or wireless technologies, such as WiFi, Bluetooth™, IR, sound, and lights. In one embodiment, controller 900 has an LED array 905 that can interact with an image capture device 105 (FIG. 1). The LED array may be configured in various layouts, including a 2×2 stack where each LEDs may be positioned at a vertex of an imaginary rectangular or square-shaped binding box. By tracking the position and deformation of the binding box as it is projected onto the image plane produced by an image capture device, the transformation and deformations may be analyzed in a video analyzer to decipher position and orientation information of the controller.

The rectangular configuration of LEDs 905 allow movement of controller 900 on three axes and rotation about each axis to be detected. Although only four LEDs are shown, it should be recognized that this is for exemplary purposes only, and any number of LEDs in any configuration would be possible. As controller 900 is pitched forward or backward, the top and bottom LEDs will get closer to each other while the left and right LEDs remain the same distance apart. Likewise, as the controller yaws left or right, the left and right LEDs will appear to approach each other while the top and bottom LEDs remain the same distance apart. Rolling motion of the controller can be detected by identifying the orientation of the LEDs on the image plane. As the controller moves closer to image capture device 105 along the line of sight thereof, all the LEDs will appear to be closer to each other. Finally, the controller's movement along the image plane can be tracked by identifying the location of the LEDs on the image plane, thereby identifying movement along respective x and y axes.

Controller 900 may also include a speaker 915 for generating audible or ultrasonic sound. Speaker 915 may generate sound effects for increased interactivity, or can transmit commands issued from interface 902 to a computer system having a microphone or other elements for receiving the transmissions.

FIG. 11 shows an exemplary application for controller 900 of FIGS. 9 and 10, in accordance with one embodiment of the present invention. In this application, a driving simulation interprets rotation of controller 900 as a rotation of a steering wheel of a virtual automobile. As a user (not shown) rotates controller 900 as shown by arrows 1105, a virtual steering wheel 900' is rotated on display 110 as shown by arrow 1105'. In one embodiment, the gearing amount can determine the amount of rotation of the virtual steering wheel 900' for each degree of rotation of controller 900. In another embodiment, the gearing amount is software controlled as represented in example graph 1200 shown in FIG. 12.

As shown in FIG. 12, the gearing amount can be varied in relation to the distance from center, i.e., a vertical orientation, of controller 900. This could allow for a full 540° rotation of the virtual steering wheel 900' with only a 90° rotation of controller 900. By maintaining a low gearing amount at positions near 0° (center), a high degree of control can be maintained for high speed driving, which generally does not require significant steering rotation. As the controller 900 is rotated farther from the center position, the gearing amount is increased as shown in graph 1200 to accommodate sharper turns as generally required at slower speeds. In another embodiment, a user can selectively alter the gearing ratio by pressing dedicated gearing button 903.

Figure 13:
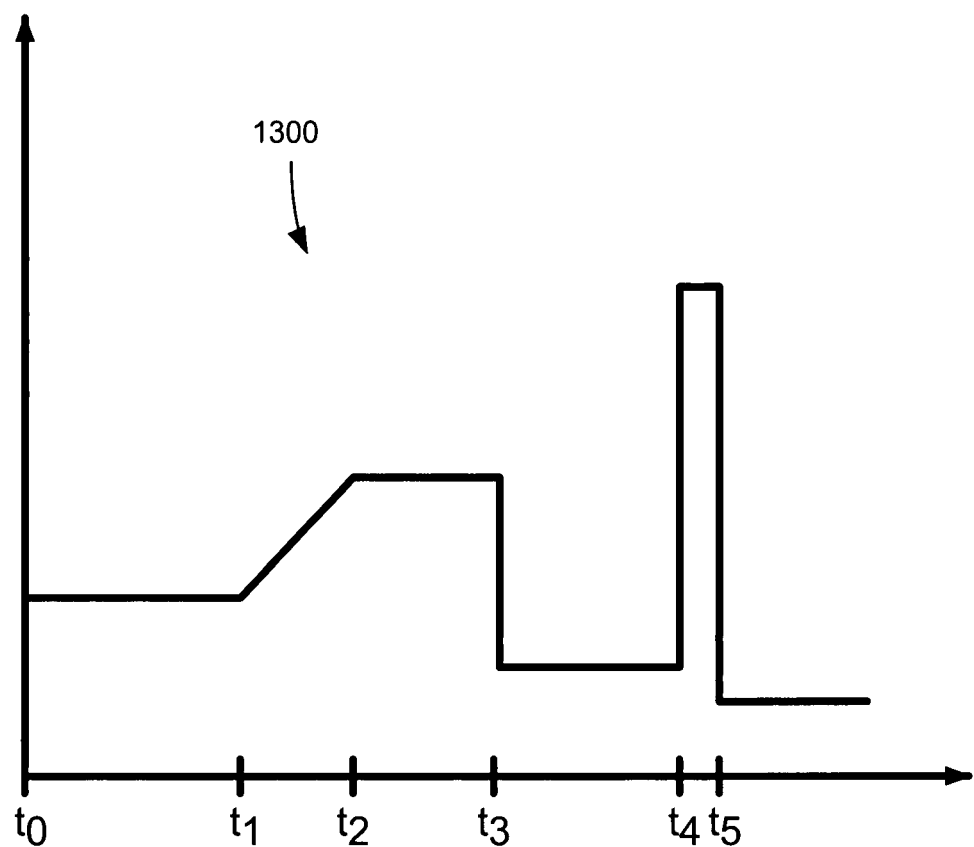
FIG. 13 shows another exemplary graph illustrating changes in gearing as a function of time as selected by pressing the dedicated gearing button, in accordance with one embodiment of the present invention.

FIG. 13 shows another exemplary graph illustrating changes in gearing as a function of time as selected by pressing the dedicated gearing button 903, in accordance with one embodiment of the present invention. As applied to a driving simulation, at t0 a user can select a first gearing ratio. Between t1 and t2, the user can selectively increase/decrease the gearing ratio as gameplay requires either increased or decreased sensitivity. Similarly, between t2 and t4, different gearing ratios can be selected by a user. Between t4 and t5, the user may spin out of control and be facing the wrong direction on the road necessitating a large gearing ratio to turn the car around. While the previous example was particular to a driving simulation, this should not be construed as limiting as user selected gearing can be applied to any user interface requiring user input.

Figure 14:
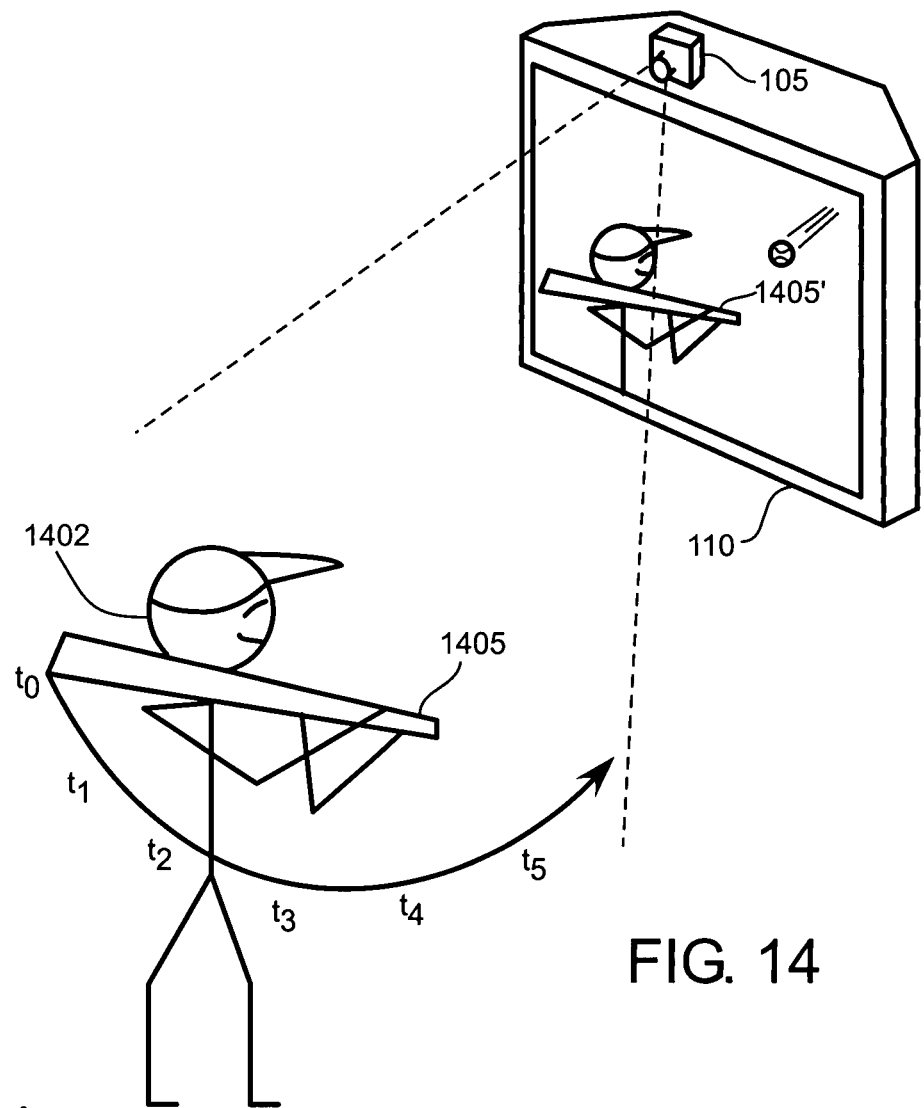
FIG. 14 shows another exemplary application of an image processing system responding to user interaction, in accordance with one embodiment of the present invention.

FIG. 14 shows another exemplary application of an image processing system responding to user interaction, in accordance with one embodiment of the present invention. In this example, a user 1402 interacts with a baseball simulation by swinging a toy baseball bat 1405 which may be recognized by the image processing system as an input object. In another embodiment, the user 1402 can use the controller 900 like a baseball bat. As the toy baseball bat 1405 is swung the user 1402 and/or the software can control the gearing amount to manipulate the speed or distance of virtual baseball bat 1405'. In one embodiment, the bat may include a number of buttons that can be pressed during game play, and by pressing the buttons, the user can selectively change the gearing. In another embodiment, the user can preset or program in a combination of gearing levels that will be applied when the bat is swung.

FIG. 15 shows graph 1500 depicting an exemplary gearing amount at different times t1-t5 along the length of the swing, in accordance with one embodiment of the present invention. In one embodiment these gearing levels may have been selected by the user while swinging the bat. In other embodiments, the gearing levels are set by the user before swinging the bat or may have been set by the game dynamically in response to the position of the bat as viewed by the camera 105. Again, it is shown how the gearing can be changed over time, kept constant over particular intervals, or gradually increased. In graph 1700, the gearing may have been set higher between times t2-t3, so that the swing of the bat will be more powerful when contact is made with the ball, and then the gearing is relaxed during time t3-t4 when the bat has already made contact. In one embodiment, the different times can be estimated by the user, or determined by the computer.

In one example, the user can take a few practice swings, and then the computer can map out a number of example time slots corresponding to the user's actual swing ability. Then, the user can custom assign specific gearing to each time interval, depending on how the user wants to impact his game interactivity. Once the gearing is set, the user's movement of the bat 1605 can then be mapped to the movement of the bat 1605' (e.g., game object). Again, it should be noted that in particular embodiments, the user can interactively change gearing during game play or preset by the game during different action.

Figure 16:
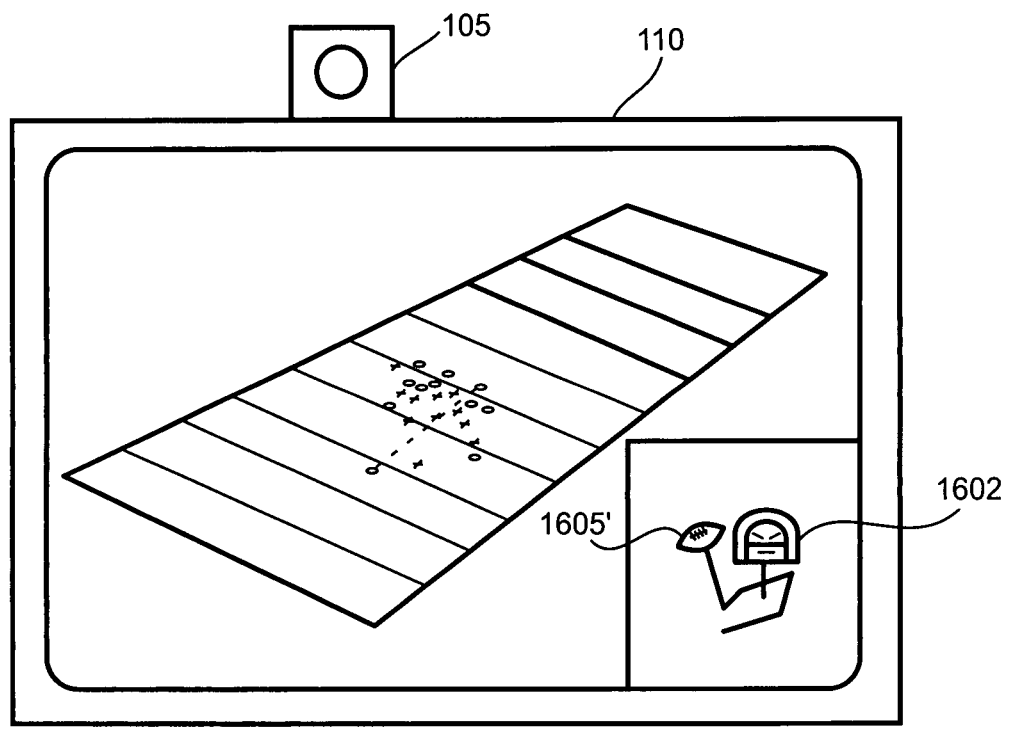
FIG. 16 shows another exemplary application of an image processing system responding to user interaction, in accordance with one embodiment of the present invention.

FIG. 16 shows another exemplary application of an image processing system responding to user interaction, in accordance with one embodiment of the present invention. In this example, a user (not shown) interacts with a football simulation by making a throwing motion with a toy football, and pressing an actuator to indicate release of the football. Of course, instead of the toy football, a controller may also be used. A virtual player 1602 manipulates a virtual football 1605 in response to user interaction. In one embodiment, the actuator causes an LED to illuminate or change color which is recognized by the image processing system as a command which is sent to the football simulation application. After releasing the ball, the user is able to control certain action on the field, such as the motion of a selected receiver. In one embodiment, the release of the ball triggers the application to send gearing data to the mapper (FIG. 7) to change the gearing amount, e.g., to allow for discriminating finer movements of the input object.

Figure 17:
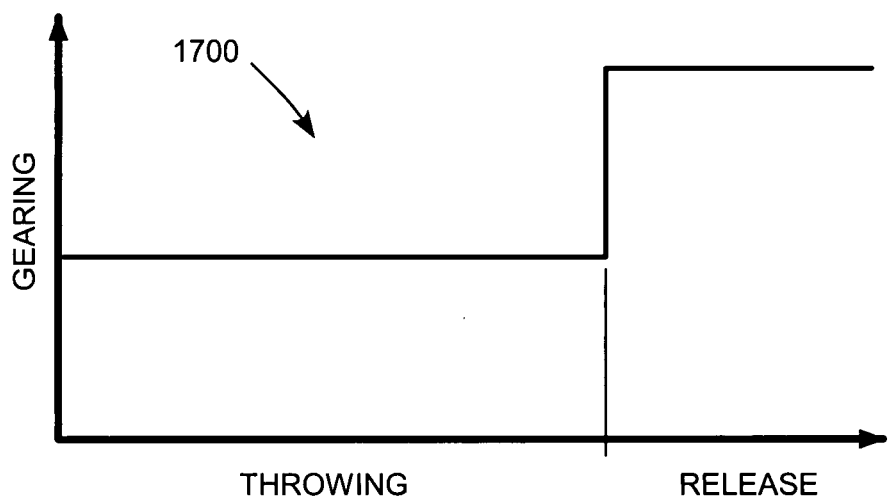
FIG. 17 shows an exemplary graph illustrating the change in gearing amount upon "releasing" the football, in accordance with one embodiment of the present invention.

FIG. 17 shows an exemplary graph 1700 illustrating the change in gearing amount upon "releasing" the football, in accordance with one embodiment of the present invention. Although shown as a simple graph 1700, it should be understood that the gearing can take on any profile, depending on the game object.

Figure 18:
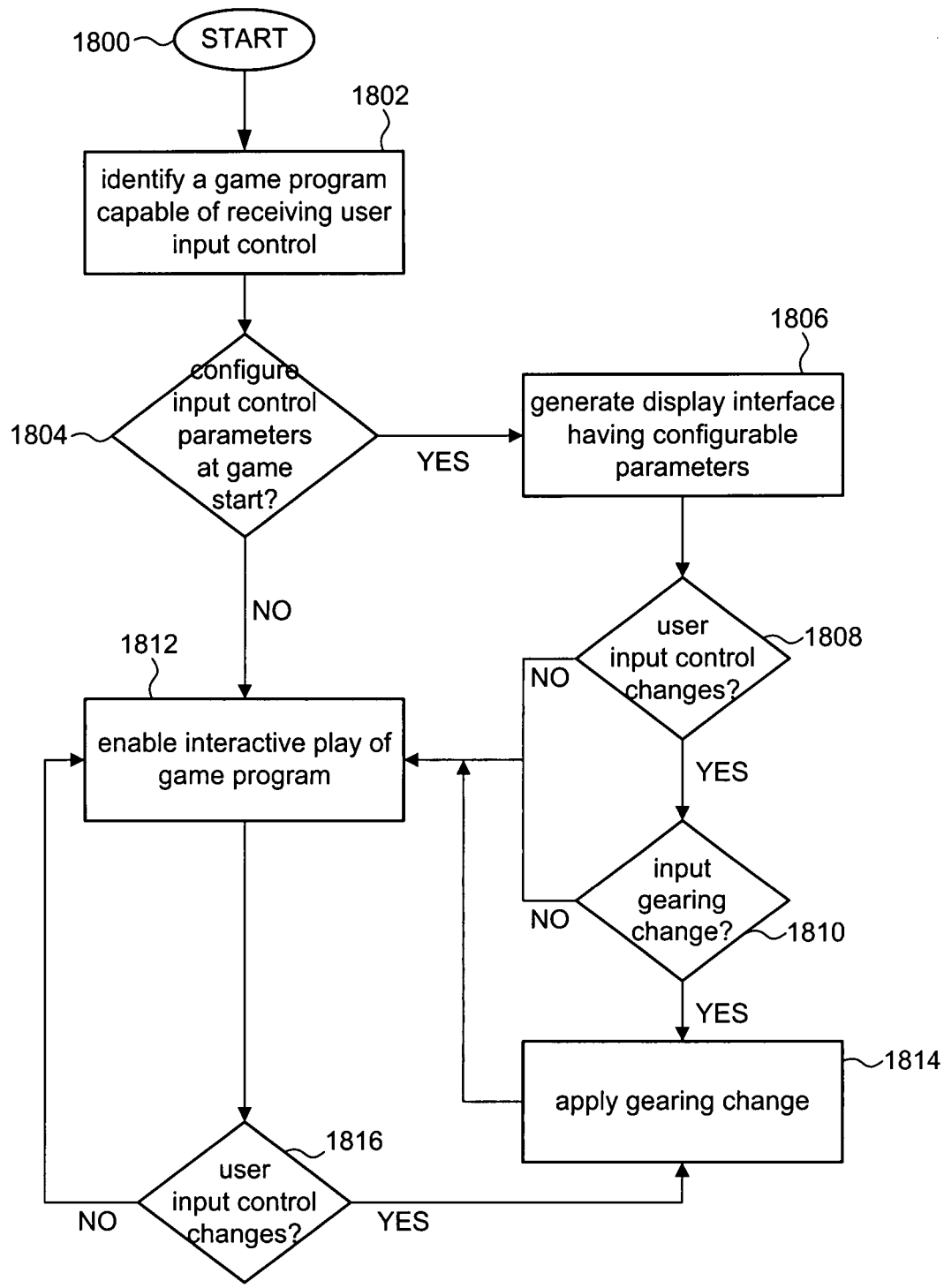
FIG. 18 shows is an exemplary flow chart illustrating operation of a video game that includes gearing, in accordance with one embodiment of the present invention.

FIG. 18 shows is an exemplary flow chart illustrating operation of a video game that includes gearing, in accordance with one embodiment of the present invention. The flow chart beings with operation 1800 and is followed by operation 1802 where a game program capable of receiving user input control is identified. Operation 1804 determines if a user wishes to configure the input control parameters upon starting the game. Operation 1806 generates a display interface having configurable parameters if the user chooses to configure the input control parameters of the game. After operation 1806, operation 1808 determines if there have user input control changes. If a change was made to the user input controls in operation 1808, operation 1810 determines whether input gearing was changed. After detecting a change to the input gearing, operation 1814 activates gearing and the procedure continues to operation 1812 where interactive play of the game program is enabled. Operation 1812 is also executed if either operation 1808 or operation 1810 do not result in changes to the user input control. While executing operation 1812, operation 1816 looks for user input control changes. After receiving the proper user input, operation 1816 advances the procedure to operation 1814. In one embodiment, user input to initiate operation 1816 can be a button push, or a combination of button pushes, on a controller. In another embodiment, a sequence of button pushes or movement of the controller in a specific direction can initiate execution of operation 1816.

Figure 19A:
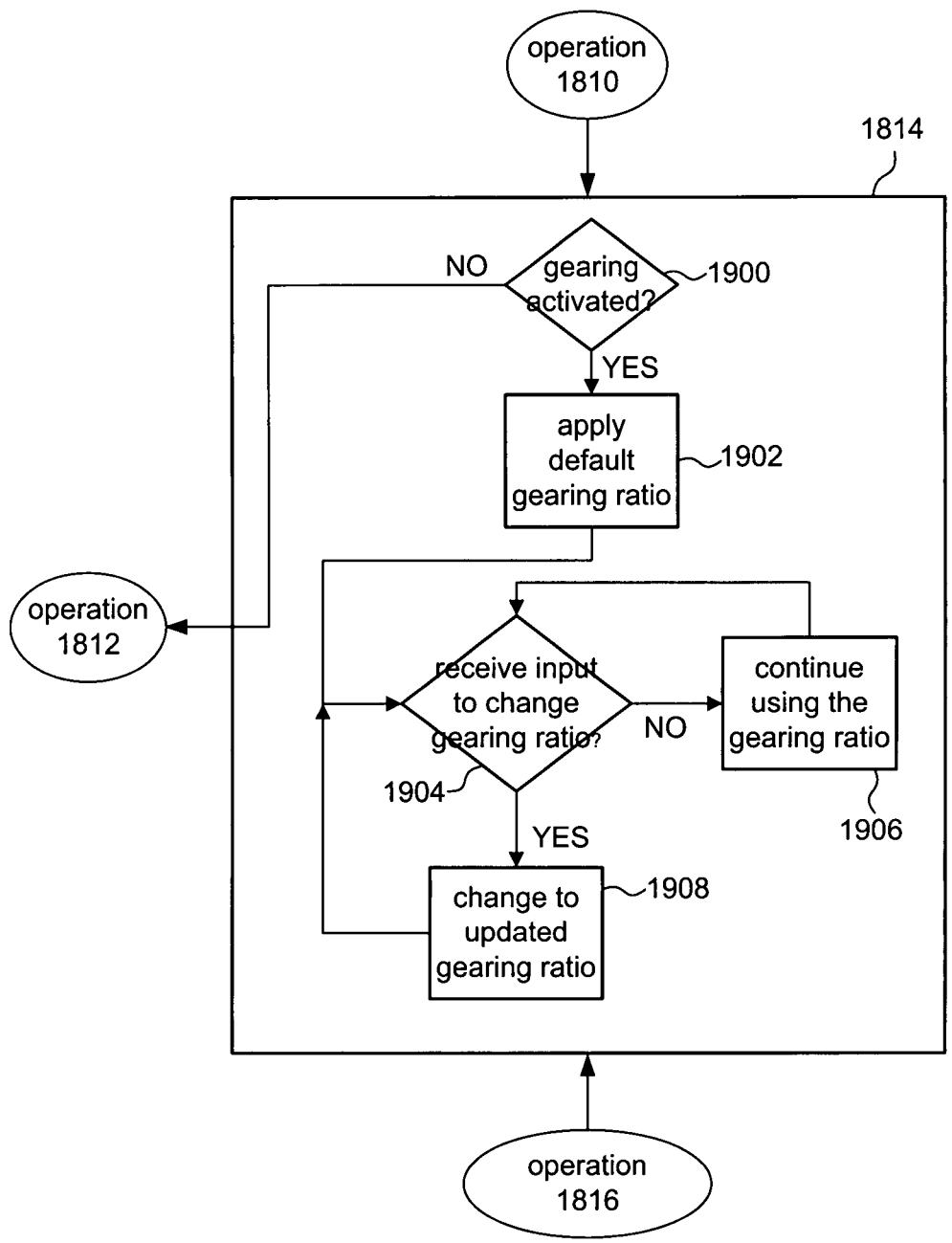
FIG. 19A shows an exemplary flow chart illustrating further details involved in activating the gearing process in accordance with one embodiment of the present invention.

FIG. 19A shows an exemplary flow chart illustrating further details involved in activating the gearing process in accordance with one embodiment of the present invention. Note that the operation represented in FIG. 19A are conducted as part of operation 1814 of FIG. 18. As previously discussed and as illustrated in FIG. 18, either operation 1810 or operation 1816 can initiate the operation 1814 in certain embodiments of the present invention. Operation 1900 determines if gearing has been activated. If gearing has not been activated, the procedure advances to operation 1812 as shown in FIG. 18. If gearing is activated in operation 1900, the procedure continues to operation 1902 where a gearing ratio is applied. The procedure can advance to operation 1904 where it waits to receive input changing the gearing ratio. If there is no input indicating a change in the gearing ratio, the procedure can advance to operation 1906 where a previously applied gearing ratio continues to be used. If input is received to change the gear ratio at operation 1904, the procedure may continue to operation 1908 where the gearing ratio is changed. In another operation, operation 1910, input to change the gearing ratio can be received. Receiving input the change the gearing ratio at operation 1910 can return the procedure to operation 1902. Otherwise, the procedure may return to operation 1906 and continue to use the previously applied gearing ratio.

Figure 19B:
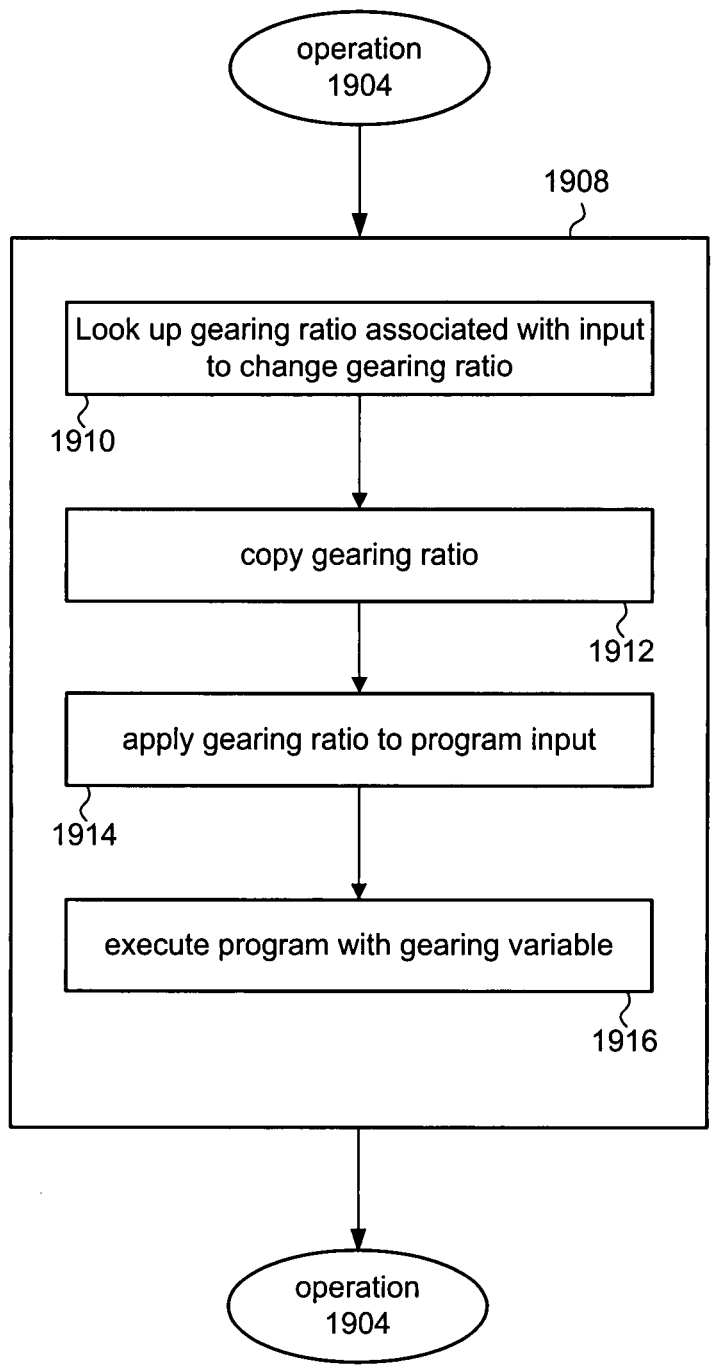
FIG. 19B shows an exemplary flow chart illustrating additional details of changing the gearing ratios, in accordance with one embodiment of the present invention.

FIG. 19B shows an exemplary flow chart illustrating additional details of changing the gearing ratios, in accordance with one embodiment of the present invention. Note that the operation represented in FIG. 19B are conducted as part of operation 1908 of FIG. 19B. Operation 1910 looks up the gearing ratio associated with the user input that initiated the change of gearing ratio. In some embodiments, various gearing ratios can be configured by a user and stored in storage memory. Storage memory can be fixed and/or removable non-volatile computer readable media that can be accessed by the game console. Since a user can map different inputs to configure non-sequential changes in gearing ratios, operation 190 looks up the gearing ratio associated with the user input in the storage memory. In operation 1912, the gearing ratio looked up in the storage memory is copied to an active memory. The active memory can generally be considered memory that is actively used during the execution of the game program. In some embodiments, the active memory location can be a memory cache associated with a central processing unit. In other embodiments, the active memory can be system memory. With operation 1914, the gearing ratio stored in active memory is applied to game program input and operation 1916 executes the game program with the gearing ratio.

FIG. 20A shows a diagram illustrating changes in gearing ratios based on various user input, in accordance with one embodiment of the present invention. The vertical axis 2000 has a variety of gearing ratios. The horizontal axis 2002 lists the progressive input necessary to change the gearing ratio. Note that the input and the gearing ratios shown in FIG. 20 are not intended to be limiting. Game controllers have multiple methods of accepting user input and there is no limitation that input can only be received using methods currently implemented on game controllers. As shown in FIG. 20, a user depressing R1 for the first time can initiate a gearing ratio of one-to-one. A second activation of the R1 button can alter the gearing ratio to one-to-two. Similarly, a subsequent third and fourth activation of R1 can initiate respective gearing ratios of one-to-three and one-to-four. In another embodiment where a game console controller has a dedicated gearing button, progressive clicks of the gearing button can change the gearing ratio. Other embodiments can use different buttons, combinations of buttons, or controller movements to achieve the same gearing changes. For example, in an embodiment where the game controller is capable of detecting controller movement, tilting the controller in a particular direction can effectuate a gearing ratio change. In another embodiment, shaking the controller in a particular direction can also be used to change the gearing ratio.

Figure 20B:
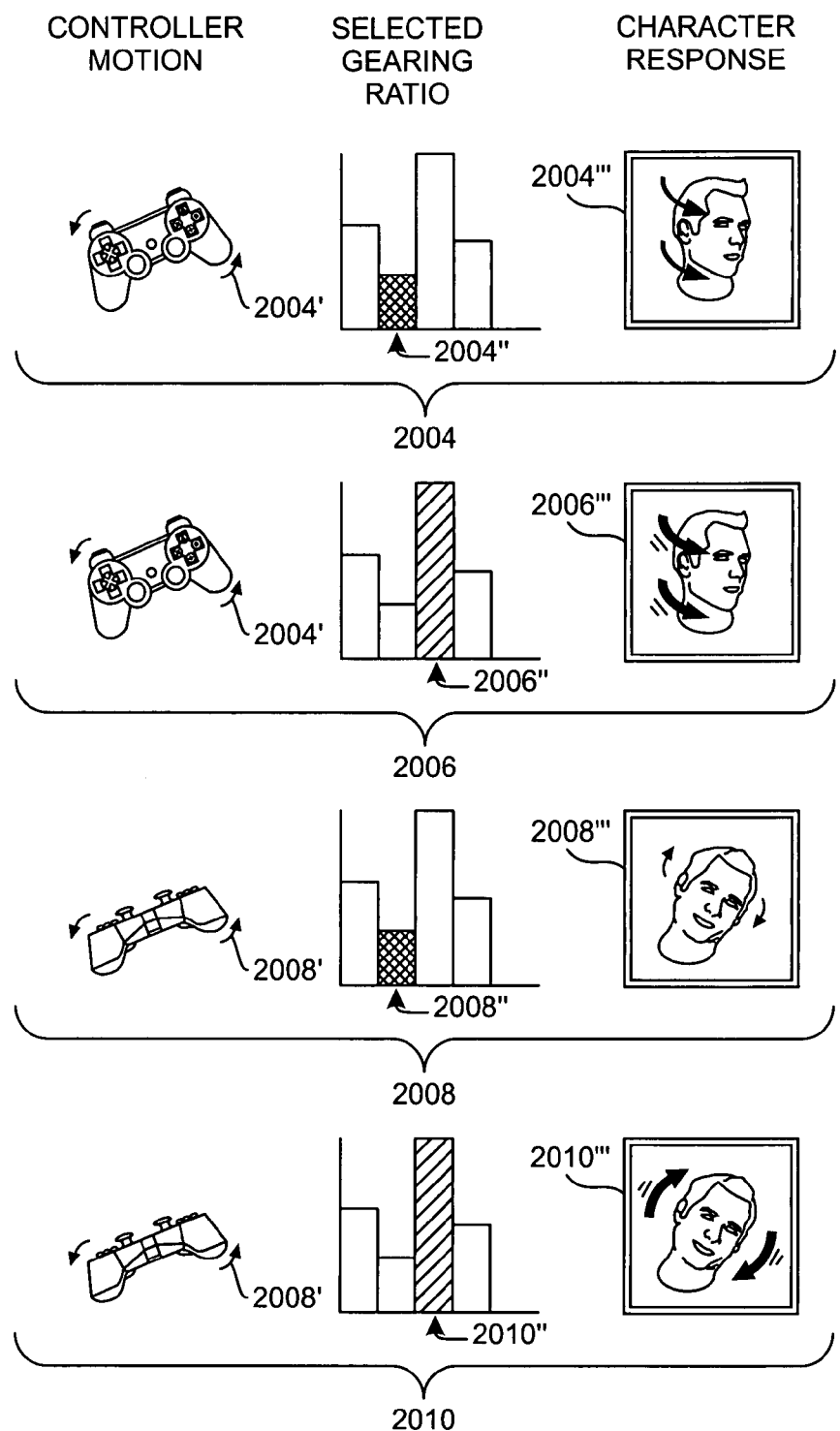
FIG. 20B illustrates the effects of different gearing ratios on character response based on user input to a motion sensitive controller, in accordance with one embodiment of the present invention.

FIG. 20B illustrates the effects of different gearing ratios on character response based on user input to a motion sensitive controller, in accordance with one embodiment of the present invention. Groups 2004-2010 each illustrate a controller motion, a selected gearing ratio, and a character response. In groups 2004 the controller motion 2004' with an applied gearing ratio 2004" results in the character rotating his head 2004''' at a particular speed. In group 2006, the same controller motion 2004' is applied to the controller but an applied gearing ratio 2006" is applied. As illustrated, the applied gearing ratio 2006" is larger than applied gearing ratio 2004" and results in the character rotating his head 2006''' at a faster speed. Groups 2008 and 2010 illustrate a similar concept with the rotation of the controller affecting the tilt of the character's head. In both groups 2008 and 2010, the controller motion 2008' is the same but the character response of 2008''' is slower than that of character response 2010''' because of the lower gearing ration 2008".

As a game player may wish to change the gearing ratio to a default setting without having the progress through a variety of gearing ratios, it is possible to return the gearing ratio to a default level using a particular button, or combinations of buttons. As shown in FIG. 20, simultaneously pressing R1 and L1 can result in the gearing ratio returning to one-to-one. Similarly, different button combinations or different buttons can be used to set the gearing ratio at a predetermined level. For example, as illustrated in FIG. 20, simultaneously pressing the R1 and R2 buttons can result in the gearing ratio being set to one-to-three. The ability to progressively or incrementally change the gear ratio can allow users to sample a variety of gearing ratios. The ability to rapidly change the gearing ratio to a preset value using button combinations or particular movements of the controller enables users to rapidly switch gearing ratios based on in game events.

An example where rapid switching of gearing ratios is desirable is in first person shooting games. One aspect found in many first person shooting games is using a weapon with an scope to snipe targets at long distances. In an effort to accurately simulate using a scoped rifle, small movements input by the user can be amplified into large movements in the game. Thus, a player may find it advantageous to initiate a gearing ratio where the user input is geared at a ratio of less than one-to-one. With a gearing ratio of less than one-to-one, input that would normally be translated into large movements can instead be translated into smaller movements. However, a gearing ratio of less than one-to-one may not be desirable when the users in-game character is not looking through the rifle scope. Thus, being able to rapidly change the gearing ratio from a one-to-one or greater ratio to a less than one-to-one ratio for use of scoped weapons can greatly improve game playability and the user's gaming experience.

Figure 21:
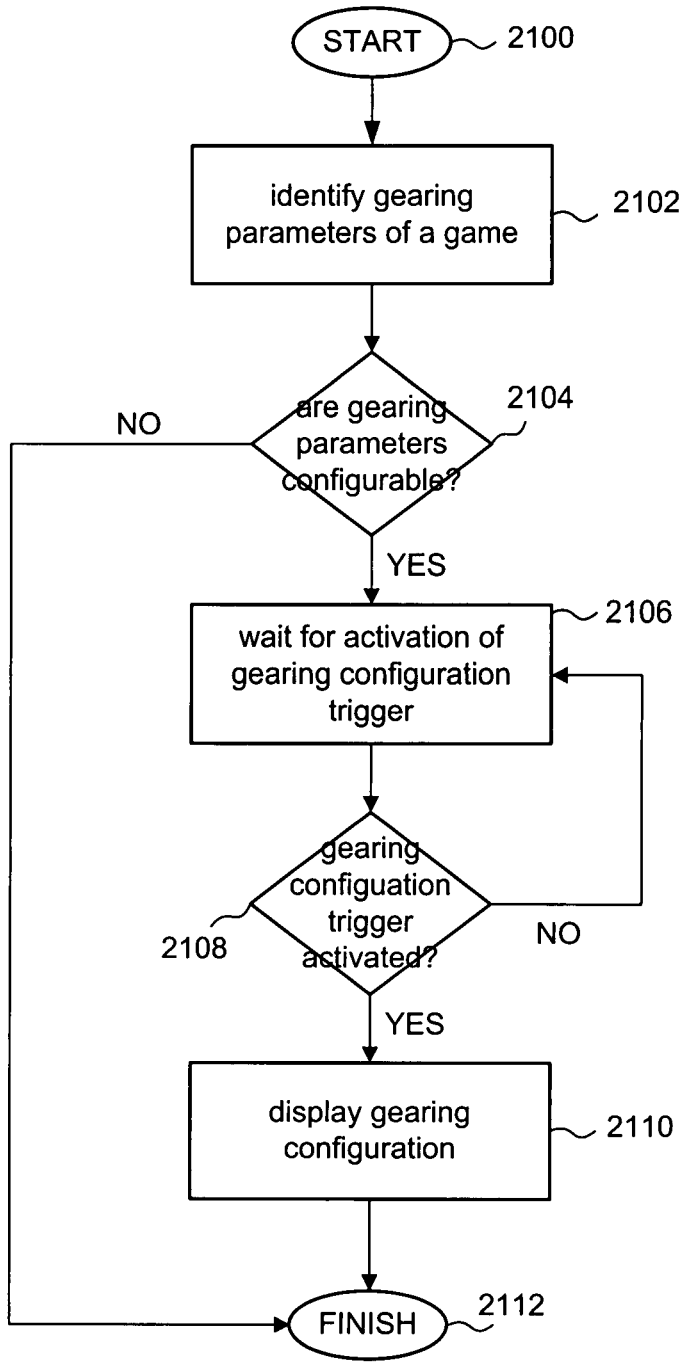
FIG. 21 is a flow diagram illustrating the procedure for initiating gearing configuration in accordance with one embodiment of the present invention.

FIG. 21 is a flow diagram illustrating the procedure for initiating gearing configuration in accordance with one embodiment of the present invention. The configuration procedure can start with operation 2100. Operation 2102 is next and is used to identify gearing parameters of a game. The procedure advances to operation 2104 where it is determined if the gearing parameters of the game are configurable. The procedure is finished at operation 2110 if the gearing parameters of the game are not configurable. Otherwise, operation 2106 waits for the activation of a gearing configuration trigger. Operation 2108 determines if the gearing configuration trigger was activated. If the gearing configuration trigger is not activated, the procedure returns to operation 2106. If the gearing configuration trigger is activated, the procedure advances to operation 2110 where the gearing configuration screen is displayed. In one embodiment, the gearing configuration screen can be manipulated using a graphical user interface controlled through a game controller. In another embodiment, voice commands can be used to manipulate the gearing configuration. In yet another embodiment, a combination of voice commands and user input through a graphical user interface can be used. After displaying the gearing configuration screen, the procedure for initiating gearing configuration finishes with operation 2112.

Figure 22:
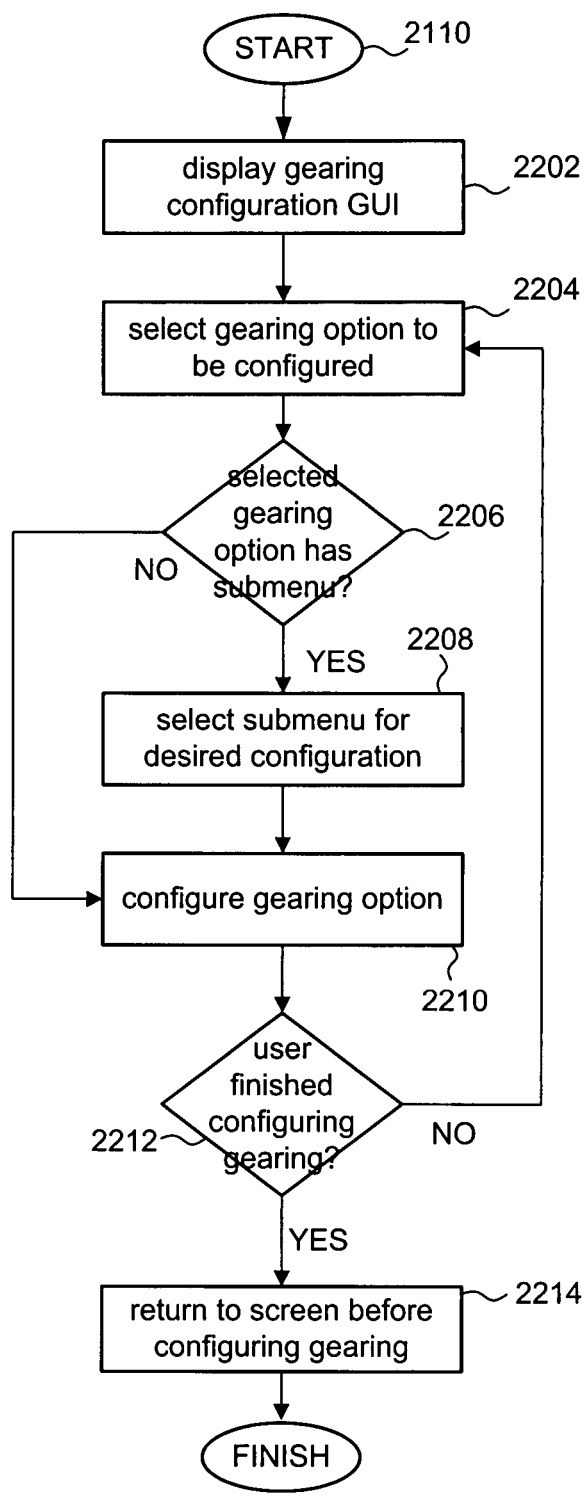
FIG. 22 is a flow chart illustrating a procedure to configure gearing ratios of a video game in accordance with one embodiment of the present invention.

FIG. 22 is a flow chart illustrating a procedure to configure gearing ratios of a video game in accordance with one embodiment of the present invention. As illustrated in FIG. 22, the procedure can be initiated by the completion of operation 2110 from FIG. 21. Operation 2202 displays the gearing configuration GUI for a particular game. With Operation 2204 a user selects the gearing options to be configured. The procedure can advance to operation 2206 where it is determined if the gearing option to be configured requires the displaying of a submenu. If there is no submenu to display, the procedure advances to operation 2210 where the gearing option is configured. If a submenu is required to configure the selected gearing option, operation 2208 displays a submenu. In another operation, operation 2210, the gearing option within the submenu is configured. After configuring the gearing option, the procedure can advance with operation 2212 where it is determined if the user is finished configuring gearing options. Operation 2214 is performed returning the user to a screen that allows the user to continue game play or configure additional aspects of the game. If the user wishes to further configure gearing options, the procedure can return to operation 2204.

In various embodiments, the image processing functions described above for determining the intensity value, controller player number, orientation and/or position of one or more input objects including controllers is carried out in a process executing on a computer system. The computing system is also executing a main process, referred to herein as an application program, which may be a gaming application, that requests or is otherwise receptive to the data generated from the image or audio processing, such data comprising controller player number, orientation and/or position of one or more input objects including controllers, controller actuation, etc. In various embodiments, the process performing the image and/or audio processing functions is a driver for a video camera or video/audio monitoring device, the driver providing the data to the main process via any type of inter-process communication which may be implementation specific as generally known and understood in the art. The process performing image or audio processing executes on the same processor or a different processor as the one executing the main process which is the gaming software or other application program. It is also possible to have a common process for both image or audio processing and game functionality in the same process, e.g., using a procedure call. Therefore, while it may be stated herein that the input vector or other information is provided "to the program" it should be recognized that the invention encompasses providing such data to one routine of a process using a procedure call or other software function such that a single process can both perform image processing functionality as well as gaming functionality, as well as separating the functions into different processes whereby one or more processes, which may execute on a common processor core or multiple processor cores, perform image and/or audio processing as described herein and a separate process performs gaming functions.

The present invention may be used as presented herein or in combination with other user input mechanisms and notwithstanding mechanisms that track the angular direction of the sound and/or mechanisms that track the position of the object actively or passively, mechanisms using machine vision, combinations thereof and where the object tracked may include ancillary controls or buttons that manipulate feedback to the system and where such feedback may include but is not limited light emission from light sources, sound distortion means, or other suitable transmitters and modulators as well as buttons, pressure pad, etc. that may influence the transmission or modulation of the same, encode state, and/or transmit commands from or to the device being tracked.

The invention may be practiced with other computer system configurations including game consoles, gaming computers or computing devices, hand-held devices, microprocessor systems, microprocessor-based or programmable consumer electronics, minicomputers, mainframe computers and the like. The invention may also be practiced in distributing computing environments where tasks are performed by remote processing devices that are linked through a network. For instance, on-line gaming systems and software may also be used.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, such as the carrier network discussed above, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, FLASH based memory, CD-ROMs, CD-Rs, CD-RWs, DVDs, magnetic tapes, and other optical and non-optical data storage devices. The computer readable medium can also be distributed over a network coupled computer systems so that the computer readable code is stored and executed in a distributed fashion.

Still further, although gearing has been discussed in relation to video games, it should be understood that the gearing can be applied to any computer controlled environment. In one example, the gearing can be associated with a computer input device that allows for the interaction, selection, or input of information. Applying different gearing during different input or interactive operations can enable further degrees of operation not normally found in environments that have pre-configured control settings. Accordingly, the embodiments of gearing, as defined herein, should be given a broad encompassing application.

Once the gearing is determined, the gearing can be applied to a gesture, that may be communicated to a computer program. As noted above, tracking of a gesture or input device can be accomplished via image analysis, inertial analysis, or audible analysis. Examples of gestures include, but are not limited to throwing an object such as a ball, swinging an object such as a bat or golf club, pumping a hand pump, opening or closing a door or window, turning steering wheel or other vehicle control, martial arts moves such as punches, sanding movements, wax-on wax-off, paint the house, shakes, rattles, rolls, football pitches, baseball pitches, turning knob movements, 3D/2D MOUSE movements, scrolling movements, movements with known profiles, any recordable movement, movements along any vector back and forth i.e. pump the tire but at some arbitrary orientation in space, movements along a path, movements having precise stop and start times, any time based user manipulation that can be recorded, tracked and repeated within the noise floor, splines, and the like. Each of these gestures may be pre-recorded from path data and stored as a time-based model. The gearing, therefore, can be applied on any one of these gestures, depending the degree of gearing set by the user or program.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A computer implemented method for enabling interactive interfacing with a computer game program executed by a processor, comprising:
   providing an input device for accepting user input and wirelessly transmitting the user input to the computer game program, the input device being hand-held and enabling activation of one or more gearing parameters associated with interactive components of the computer game program;
   identifying an interactive component of the computer game program, the interactive component receiving the transmitted user input to enable the interactive interfacing; and
   detecting the user input at the input device to apply one of the one or more gearing parameters to the interactive component if the transmitted user input dictates, the applied gearing parameter defining a scaling ratio between the user input and a rate at which the interactive component reacts during execution of the computer game program, the application of the rate at which the interactive component reacts being defined for events occurring during the execution of the computer game program,
   wherein the scaling ratio for the gearing parameter that is applied is configured to additionally change in response to particular events occurring during execution of the computer game program without additional user command to change the gearing parameter.

2. The computer implemented method for enabling interactive interfacing with the computer game program as recited in claim 1, further comprising:
   monitoring the user input to determine if a change in the applied gearing parameter has occurred; and
   applying an updated gearing parameter when the change in the applied gearing parameter has occurred, the updated gearing parameter defining a new scaling ratio.

3. The computer implemented method for enabling interactive interfacing with the computer game program as recited in claim 2, wherein repetition of the user input cycles between a plurality of updated gearing parameters.

4. The computer implemented method for enabling interactive interfacing with the computer game program as recited in claim 3, wherein a different user input applies a particular gearing parameter, the particular gearing parameter associated with the different user input.

5. The computer implemented method for enabling interactive interfacing with the computer game program as recited in claim 1, wherein the input device accepts the user input based on motion sensors capable of detecting translational and rotational movement in three orthogonal axes.

6. The computer implemented method for enabling interactive interfacing with the computer game program as recited in claim 1, further comprising:
   detecting sound;
   processing the sound to determine if the sound should be mapped to the user input; and
   if the sound is determined to be mapped to the user input, applying the user input to apply one of the gearing parameters during execution of the computer game program.

7. The computer implemented method for enabling interactive interfacing with the computer game program as recited in claim 1, wherein the applied gearing parameter includes one of a plurality of different scaling ratios to be applied to different interactive components of the computer game program.

8. The computer implemented method for enabling interactive interfacing with the computer game program as recited in claim 1, wherein the applied gearing parameter is configurable using a graphical user interface.

9. A computer implemented method for enabling user controlled application of gearing parameters to interactive components of a computer program executing on a computer having a processor, comprising:
   providing an input device for accepting user input and wirelessly transmitting the user input to a computer system that is at least partially executing the computer program, the input device being hand-held and enabling application of one or more gearing ratios associated with the interactive components of the computer program;
   receiving a gearing trigger at the computer from the input device, the gearing trigger being a particular type of the user input;
   looking up a gearing parameter associated with the gearing trigger, the gearing parameter stored in a first memory associated with the computer system and defining a scaling ratio between the user input and a rate at which the interactive component reacts during execution of the computer program, the application of the rate at which the interactive component reacts being defined for events occurring during the execution of the computer program, and the scaling ratio for the gearing parameter is configured to additionally change in response to particular events occurring during execution of the computer program without additional user command to change the gearing parameter;

copying the gearing parameter from a first memory to a second memory, the second memory for storing an applied gearing parameter; and executing the computer program using the applied gearing parameter obtained from the second memory so that subsequent user input responds according to the scaling ratio and changes to the scaling ratio in response to the particular events occurring during execution of the computer program.

10. The computer implemented method as recited in claim 9, wherein the input device is capable of detecting, and the computer program is responsive to, translational and rotational movements of the input device in three orthogonal axes.

11. The computer implemented method as recited in claim 9 wherein the computer system is part of a computer network and the computer program allows interaction between other users of the computer network.

12. The computer implemented method as recited in claim 11, wherein execution of the computer program can be shared between computer systems connected to the computer network.

13. A computer implemented method for changing responses of interactive components of a computer game program that executes on a processor of a game console, comprising:

at an input device that is hand-held, detecting user input and wirelessly transmitting the user input to the game console;

executing the computer game program at the game console;

during execution of the computer game program, detecting the user input to include an instruction to change a gearing parameter from a first state to a second state;

applying the change in the gearing parameter to the second state during the execution of the computer game program, the gearing parameter defining a scaling ratio between the user input and a rate at which an interactive component of the computer game program reacts during execution of the computer game program, wherein the scaling ratio of the gearing parameter, when in the second state, is configured to additionally change based on specific in-game events without requiring additional user command to change the gearing parameter; and continuing interaction with the user input device in the second state until an additional instruction based on the user input is detected to cause a change in the gearing parameter from the second state to the first state or to another state;

wherein the changes in the gearing parameter are interactively set during interaction with the interactive component.

14. The method of claim 13, wherein the user input is derived from detected translational and rotational movements of the input device.

15. The method of claim 13, wherein the user input is providing by selecting a button on the input device or pointing the input device toward an object on a video display that is in communication with the game console.

16. The method of claim 13, further comprising, detecting a position of the input device and movements of the input device through an image capture device that is interfaced with the game console;

the detected position and movements used as a factor to determine if a change in the gearing parameter is to be applied.

* * * * *